(12) United States Patent
Nakaura et al.

(10) Patent No.: US 7,699,411 B2
(45) Date of Patent: Apr. 20, 2010

(54) ANTISKID CONTROL APPARATUS FOR VEHICLE

(75) Inventors: Toru Nakaura, Nagoya (JP); Masato Terasaka, Nagoya (JP); Yoshiaki Kito, Nagoya (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 638 days.

(21) Appl. No.: 11/526,782

(22) Filed: Sep. 26, 2006

(65) Prior Publication Data

US 2007/0069577 A1 Mar. 29, 2007

(30) Foreign Application Priority Data

Sep. 29, 2005 (JP) ............................. 2005-283470

(51) Int. Cl.
 *B60T 8/66* (2006.01)
(52) U.S. Cl. .................. 303/156; 303/119.1; 701/78
(58) Field of Classification Search ................. 303/156, 303/157, 158, 162, 113.1, 116.1, 119.1, 119.2; 701/71, 78

See application file for complete search history.

(56) References Cited

U.S. PATENT DOCUMENTS

| | | | | |
|---|---|---|---|---|
| 5,348,380 A | * | 9/1994 | Korasiak et al. | 303/167 |
| 5,454,629 A | * | 10/1995 | Johnson | 303/156 |
| 5,662,388 A | * | 9/1997 | Wuerth et al. | 303/156 |
| 7,055,539 B2 | * | 6/2006 | Suzuki | 303/119.2 |
| 7,216,939 B2 | * | 5/2007 | Obai | 303/114.3 |

FOREIGN PATENT DOCUMENTS

JP 2003-019952 A 1/2003

* cited by examiner

*Primary Examiner*—Thomas J Williams
(74) *Attorney, Agent, or Firm*—Buchanan Ingersoll & Rooney PC

(57) ABSTRACT

An ABS control apparatus employs a normally-open linear solenoid valve as a pressure-increasing valve, and repeatedly performs ABS control composed of pressure-reducing control and linear pressure-increasing control. This apparatus determines an initial value $Pw0$ of an estimated wheel cylinder pressure value $Pw$ in consideration of brake operation time before start of ABS control $Tstp$ and vehicle body deceleration at the start of a first-time ABS control, and then determines the estimated wheel cylinder pressure value $Pw$ during the ABS control on the basis of the value $Pw0$ and the pressure-reducing characteristic of a pressure-reducing valve. This apparatus determines instruction current supplied to the pressure-increasing valve during the linear pressure-increasing control, while using an estimated differential pressure $Pdiff$ ($=(Pw0-Pw)+Pup1+Pup2$), wherein $Pup1$ and $Pup2$ are set in accordance with the time $Tstp$ and additional brake operation during the ABS control, respectively.

12 Claims, 24 Drawing Sheets

ANTISKID CONTROL APPARATUS FOR VEHICLE

BACKGROUND OF THE INVENTION

1. Field of the Invention

The present invention relates to an antiskid control apparatus for a vehicle which performs antiskid control for preventing excessive slip of wheels (hereinafter referred to as "ABS control").

2. Description of the Related Art

In general, an antiskid control apparatus includes a normally-open solenoid valve (pressure-increasing valve) interposed in a hydraulic circuit between the wheel cylinder and a master cylinder capable of generating brake hydraulic pressure (hereinafter referred to as "master cylinder pressure") corresponding to a driver's brake operation; and a normally-closed solenoid valve (pressure-reducing valve) interposed in a hydraulic circuit between the wheel cylinder and a reservoir.

In general, ABS control is started when predetermined ABS-control start conditions are satisfied, and is accomplished by performing at least pressure-reducing control, and then pressure-increasing control. And the ABS control is continuously performed a plurality of times over a plurality of control cycles.

Incidentally, in recent years, there has arisen demand for control in which the wheel cylinder pressure is increased smoothly (seamlessly) during the above-mentioned pressure-increasing control (hereinafter referred to as "linear pressure-increasing control"). Therefore, some antiskid control apparatuses employ a linear solenoid valve (in particular, a normally-open linear solenoid valve) as the above-mentioned pressure-increasing valve. Such a linear solenoid valve enables the differential pressure (hereinafter referred to as "actual differential pressure") obtained by subtracting the wheel cylinder pressure from the master cylinder pressure to be seamlessly adjusted by means of linearly controlling the current supplied to the pressure-increasing valve (see, for example, Japanese Patent Application Laid-Open (kokai) No. 2003-19952).

In general, in a normally-open linear solenoid valve, proportionality exists between supplied current (instruction current) and differential pressure corresponding to attraction force (hereinafter referred to as "instruction differential pressure"). Accordingly, a normally-open linear solenoid valve, which serves as a pressure-increasing valve, closes when the instruction differential pressure determined from the supplied current is greater than the actual differential pressure, to thereby break the communication between the master cylinder and the wheel cylinder, and opens when the instruction differential pressure is less than the actual differential pressure, to thereby establish the communication between the master cylinder and the wheel cylinder.

Meanwhile, when the instruction differential pressure is less than the actual differential pressure, brake fluid flows from the master cylinder side into the wheel cylinder, whereby the wheel cylinder pressure increases, and the actual differential pressure decreases. When the actual differential pressure becomes equal to the instruction differential pressure, the actual differential pressure attains a balance with the instruction differential pressure.

That is, in order to smoothly increase the wheel cylinder pressure immediately after the linear pressure-increasing control is started by use of a normally-open linear solenoid valve serving as a pressure-increasing valve, the current supplied to the normally-open linear solenoid valve (pressure-increasing valve) must be controlled, with the pressure-reducing valve maintained closed, in such a manner that the current supplied to the normally-open linear solenoid valve is immediately set to a current value corresponding to the actual differential pressure (that is, a supply current value for rendering the instruction differential pressure coincident with the actual differential pressure; hereinafter referred to as "actual-differential-pressure corresponding current value") at the start of the linear pressure-increasing control, and the supply current value is linearly decreased at a constant gradient. By virtue of this control, the actual differential pressure smoothly decreases from the start of the linear pressure-increasing control, which enables the wheel cylinder pressure to smoothly increase throughout the linear pressure-increasing control.

In contrast, in the case where the supply current value, which decreases throughout the linear pressure-increasing control, is set to a value greater than the actual-differential-pressure corresponding current value at the start of the linear pressure-increasing control, the normally-open linear solenoid valve is maintained in its closed state and the wheel cylinder pressure is held from the start of the linear pressure-increasing control until the decreasing instruction differential pressure becomes equal to the actual differential pressure. Herein, this phenomenon will be called "delay in starting of wheel cylinder pressure increase."

Meanwhile, in the case where the supply current value, which decreases throughout the linear pressure-increasing control, is set to a value less than the actual-differential-pressure corresponding current value at the start of the linear pressure-increasing control, there arises a problem in that the normally-open linear solenoid valve is maintained in its opened state and the wheel cylinder pressure abruptly increases until the actual differential pressure, which decreases because of a flow of brake fluid from the master cylinder side into the wheel cylinder, becomes equal to the instruction differential pressure. Herein, this phenomenon will be called "abrupt increase of wheel cylinder pressure."

Accordingly, in order to smoothly increase the wheel cylinder pressure immediately after the start of the linear pressure-increasing control, the actual-differential-pressure corresponding current value at the start of the linear pressure-increasing control (that is, the actual differential pressure at that time point) must be precisely determined. The actual differential pressure can be readily detected by use of a sensor for detecting the master cylinder pressure and a sensor for detecting the wheel cylinder pressure. However, the configuration utilizing such two sensors is not suitable for general employment. Therefore, the brake hydraulic pressure control apparatus disclosed in the above-mentioned publication, which performs linear pressure-increasing control, is designed to set the supply current value at the start of the linear pressure-increasing control to its maximum value in a first control cycle (first-time ABS control).

By virtue of this design, the instruction differential pressure at the start of the linear pressure-increasing control in the first control cycle becomes greater than the actual differential pressure without fail.

As a result, the actual differential pressure (=the instruction differential pressure) during the linear pressure-increasing control after the time point at which the instruction differential pressure has reached the actual differential pressure can be obtained. The apparatus disclosed in the above-mentioned publication is configured to obtain the actual differential pressure during a second or subsequent control cycle on the basis of the thus-obtained actual differential pressure.

However, in this case, there arises a problem in that the above-described "delay in starting of wheel cylinder pressure increase" always occurs in the linear pressure-increasing control in the first control cycle. According, desire has arisen for an alternative method which can properly estimate the actual differential pressure during ABS control.

SUMMARY OF THE INVENTION

The present invention has been accomplished to cope with the above-described problem, and an object of the present invention is to provide an antiskid control apparatus for a vehicle which performs ABS control and which can properly estimate the differential pressure between master cylinder pressure and wheel cylinder pressure.

The antiskid control apparatus according to the present invention comprises antiskid control means capable of continuously performing ABS control a plurality of times, the ABS control being started when predetermined ABS-control start conditions are satisfied. In the ABS control, pressure-reducing control is performed, and pressure-increasing control is then performed until the ABS-control start conditions are satisfied again. In the pressure-reducing control, a pressure-reducing valve is controlled with a pressure-increasing valve kept closed so as to reduce wheel cylinder pressure, which is the brake hydraulic pressure within the wheel cylinder. In the pressure-increasing control, the pressure-increasing valve is controlled with the pressure-reducing valve kept closed so as to increase the wheel cylinder pressure.

The antiskid control apparatus according to the present invention is characterized in that the antiskid control means comprises estimated-initial-wheel-cylinder-pressure-value obtaining means, estimated-wheel-cylinder-pressure-value obtaining means, estimated-differential-pressure-value obtaining means, and pressure-increasing-valve control means. These means will now be described successively.

The estimated-initial-wheel-cylinder-pressure-value obtaining means obtains an estimated initial wheel cylinder pressure value, which is an estimated value of wheel cylinder pressure at the start of a first-time ABS control. Although the estimated initial wheel cylinder pressure value may be a constant value, it is preferably set to a value corresponding to the traveling condition of the vehicle, as will be described later.

The estimated-wheel-cylinder-pressure-value obtaining means obtains an estimated value of the wheel cylinder pressure, which changes throughout the ABS control, by making use of at least the estimated initial wheel cylinder pressure value. For example, in the case where an on-off solenoid valve is used as the pressure-reducing valve, the pressure drop in the wheel cylinder pressure due to operation of the pressure-reducing valve changes depending on the wheel cylinder pressure itself, and a time over which the pressure-reducing valve is maintained in its opened state. Such a pressure drop characteristic realized by the pressure-reducing valve can be obtained in advance through a predetermined experiment, simulation, or the like.

Accordingly, for example, in the case where an on-off solenoid valve is used as the pressure-reducing valve and control in which the pressure-reducing valve is maintained in its opened state is performed as the pressure-reducing control, if the estimated wheel cylinder pressure value at the start of the pressure-reducing control in the first-time ABS control is set to a value equal to the estimated initial wheel cylinder pressure value, the estimated wheel cylinder pressure value, which changes (decreases) throughout the pressure-reducing control, can be determined on the basis of the pressure drop characteristic realized by the pressure-reducing valve.

Similarly, for example, in the case where an on-off solenoid valve is used as the pressure-increase valve, the pressure rise in the wheel cylinder pressure due to operation of the pressure-increasing valve changes depending on the differential pressure between the master cylinder pressure and the wheel cylinder pressure, and a time over which the pressure-increasing valve is maintained in its opened state. Such a pressure rise characteristic realized by the pressure-increasing valve can also be obtained in advance through a predetermined experiment, simulation, or the like.

Accordingly, for example, in the case where an on-off solenoid valve is used as the pressure-increasing valve and control in which the pressure-increasing valve is alternately and repeatedly opened and closed (hereinafter referred to as "open-close pressure-increasing control") is performed as the pressure-increasing control, if the estimated wheel cylinder pressure value at the time of start of the pressure-increasing control in the first-time ABS control is set to a value equal to the estimated wheel cylinder pressure value at the end of the pressure-reducing control in the first-time ABS control, which can be determined in the above-described manner, the estimated wheel cylinder pressure value, which changes (increases) throughout the pressure-increasing control, can be determined on the basis of the open-close pattern of the pressure-increasing valve in the open-close pressure-increasing control and the pressure rise characteristic realized by the pressure-increasing valve.

Meanwhile, in the case where a linear solenoid valve is used as the pressure-increasing valve and the above-described linear pressure-increasing control is performed as the pressure-increasing control, if the estimated wheel cylinder pressure value at the start of the pressure-increasing control in the first-time ABS control is set in the same manner as in the case where an on-off solenoid valve is used as the pressure-increasing valve, the estimated wheel cylinder pressure value, which changes (increases) throughout the pressure-increasing control, can be determined on the basis of a previously set rise gradient of the wheel cylinder pressure during the linear pressure-increasing control.

Once the estimated wheel cylinder pressure value at the start of the first-time ABS control (=estimated initial wheel cylinder pressure value) is set in the above-described manner, the estimated wheel cylinder pressure value, which changes throughout the first-time ABS control, can be obtained. Accordingly, if the estimated wheel cylinder pressure value at the start of a second-time ABS control is set to a value equal to the estimated wheel cylinder pressure value at the end of the pressure-increasing control in the first-time ABS control, the estimated wheel cylinder pressure value, which changes throughout the second-time ABS control, can be obtained as in the case of the first-time ABS control.

The estimated wheel cylinder pressure value in a third-time or subsequent ABS control can also be obtained through repetition of the above-described steps. As described above, the estimated-wheel-cylinder-pressure-value obtaining means obtains the estimated wheel cylinder pressure value, which changes throughout the ABS control continuously performed a plurality of times, by making use of at least the estimated initial wheel cylinder pressure value.

The estimated-differential-pressure-value obtaining means obtains an estimated value (differential pressure estimated value) of the differential pressure between the master cylinder pressure and the wheel cylinder pressure on the basis of the difference between the estimated initial wheel cylinder pressure value and the estimated wheel cylinder pressure value.

In general, the master cylinder pressure during ABS control is considered to change within a range close to the wheel cylinder pressure at the start of the first-time ABS control.

Accordingly, the differential pressure (the above-described actual differential pressure) between the master cylinder pressure and the wheel cylinder pressure during ABS control changes within a range close to the difference between the estimated initial wheel cylinder pressure value and the estimated wheel cylinder pressure value. The estimated-differential-pressure-value obtaining means is configured on the basis of such knowledge. With this configuration, the above-described estimated differential pressure value (accordingly, actual differential pressure) during ABS control can be estimated and obtained properly and precisely.

The pressure-increasing-valve control means controls the pressure-increasing valve during the pressure-increasing control on the basis of the estimated differential pressure value. Specifically, in the case where a linear solenoid valve is used as the pressure-increasing valve, the pressure-increasing-valve control means is configured to determine the current supplied to the pressure-increasing valve (supply current value) during the pressure-increasing control on the basis of the estimated differential pressure value. With this configuration, the supply current value at the start of the pressure-increasing control can be set to a value close to the actual-differential-pressure corresponding current value on the basis of the estimated differential pressure value, which can be accurately determined as described above. As a result, when the linear pressure-increasing control is performed, the wheel cylinder pressure can be smoothly increased from the time of start of the linear pressure-increasing control.

Meanwhile, in the case where an on-off solenoid valve is used as the pressure-increasing valve, the pressure-increasing-valve control means is configured to determine the open-close pattern of the pressure-increasing valve during the (open-close) pressure-increasing control, on the basis of the estimated differential pressure value. In the case where the open-close pressure-increasing control is performed, the pressure rise in the wheel cylinder pressure when the pressure-increasing valve is in its open state can be precisely obtained on the basis of the estimated differential pressure value, which can be accurately determined as described above. Accordingly, in the case where the open-close pattern of the pressure-increasing valve is determined by the above-described configuration, the average rising gradient of the wheel cylinder pressure which is repeatedly increased and held throughout the open-close pressure-increasing control can be easily made coincident with the rising gradient of the wheel cylinder pressure in the case where the above-described linear pressure-increasing control is performed by use of a linear solenoid valve.

In the antiskid control apparatus according to the present invention, preferably, the estimated-initial-wheel-cylinder-pressure-value obtaining means is configured to obtain the estimated initial wheel cylinder pressure value in consideration of a wheel cylinder pressure at which wheel lock occurs (hereinafter also referred to as "lock pressure"), which is obtained on the basis of vehicle body deceleration of the vehicle.

When the wheel cylinder pressure is gradually increased during travel of the vehicle, wheel lock occurs when the wheel cylinder pressure reaches the lock pressure. The lock pressure can be obtained on the basis of the vehicle body deceleration (e.g., the vehicle body deceleration at the time of start of the first-time ABS control).

Meanwhile, the wheel cylinder pressure at the start of the first-time ABS control (i.e., the above-described estimated initial wheel cylinder pressure value, which is the estimated value of that wheel cylinder pressure) is close to the lock pressure. Therefore, according to the above-described configuration, the estimated initial wheel cylinder pressure value can be set to, for example, a value equal to the lock pressure, and thus the estimated initial wheel cylinder pressure value can be precisely obtained irrespective of the road-surface fictional coefficient. In other words, the estimated differential pressure value can be precisely estimated and obtained without delay from the middle of the first-time ABS control, irrespective of the road-surface fictional coefficient.

In this case, preferably, the estimated-initial-wheel-cylinder-pressure-value obtaining means is configured to obtain the estimated initial wheel cylinder pressure value in consideration of a time interval between the start of a driver's brake operation and the start of the first-time ABS control. More specifically, the estimated-initial-wheel-cylinder-pressure-value obtaining means is preferably configured such that the estimated initial wheel cylinder pressure value obtained in consideration of the lock pressure (wheel cylinder pressure at which wheel lock occurs) determined on the basis of the vehicle body deceleration is corrected on the basis of the time interval between the start of the driver's brake operation and the start of the first-time ABS control.

In general, when the vehicle body deceleration is used for ABS control or other vehicle motion controls, it is used after undergoing low-pass filter processing in order to eliminate noise or the like. Accordingly, when the actual vehicle body deceleration increases abruptly because of an abrupt or quick brake operation, the vehicle body deceleration used for the ABS control slowly increases with delay and assumes a value smaller than the actual vehicle body deceleration.

This means that the greater the degree of abruptness of brake operation triggering ABS control, the greater the underestimation of the lock pressure obtained on the basis of the vehicle body deceleration and thus the greater the underestimation of the above-described initial wheel cylinder pressure value estimated in consideration of the lock pressure. Accordingly, the greater the degree of abruptness of brake operation triggering ABS control, the greater the necessity for correcting to a larger value the estimated initial wheel cylinder pressure value obtained in consideration of the lock pressure.

Meanwhile, there is a tendency that the greater the degree of abruptness of brake operation triggering ABS control, the shorter the time interval between the start of the brake operation and the start of the first-time ABS control (hereinafter referred to as "brake operation time before the start of ABS control").

In view of the above, it is desired that the shorter the brake operation time before the start of ABS control, the larger the value to which the estimated initial wheel cylinder pressure value determined in consideration of the lock pressure is corrected. The above-described configuration is based on this knowledge. By virtue of this configuration, the estimated initial wheel cylinder pressure value can be precisely estimated and obtained even when the brake operation triggering the ABS control is performed abruptly. In other words, the estimated differential pressure value can be precisely estimated and obtained without delay from the middle of the first-time ABS control, even when the bake operation triggering the ABS control is performed abruptly.

In the antiskid control apparatus according to the present invention, preferably, the estimated-differential-pressure-value obtaining means is configured to set the estimated differential pressure value to be larger by an amount corresponding to the time between the start of the driver's brake operation and the start of the ABS control, from the start of the pressure-increasing control in the first-time ABS control.

As previously described, the master cylinder pressure during ABS control changes within a range close to the wheel cylinder pressure at the time of start of the first-time ABS control. In actuality, the master cylinder pressure often increases further from the wheel cylinder pressure at the time of start of the first-time ABS control, over a short period from the time of start of the first-time ABS control.

Accordingly, the master cylinder pressure during the ABS control often changes in the vicinity of a value which is obtained by adding, to the above-described estimated initial wheel cylinder pressure value, an increase in the master cylinder pressure immediately after the start of the first-time ABS control. Thus, in order to obtain the estimated differential pressure value more precisely, the estimated differential pressure value is preferably set to be larger by an amount corresponding to the increase in the master cylinder pressure immediately after the start of the first-time ABS control. Meanwhile, this increase in the master cylinder pressure tends to increase as the brake operation time before the start of ABS control decreases.

In view of the above, it is desired that the shorter the brake operation time before the start of ABS control, the larger the value to which the estimated differential pressure value is set. The above-described configuration is based on this knowledge. By virtue of this configuration, the estimated differential pressure value (accordingly, actual differential pressure) can be precisely estimated and obtained even when the brake operation triggering ABS control is abrupt. Notably, the estimated differential pressure value can be set to a larger value by means of, for example, correcting the calculated estimated differential pressure value to a somewhat larger value or correcting the estimated initial wheel cylinder pressure value used for calculation of the estimated differential pressure value to a somewhat larger value.

In the antiskid control apparatus according to the present invention, when a linear solenoid valve is used as the pressure-increasing valve (accordingly, when linear pressure-increasing control is performed as the pressure-increasing control), preferably, the estimated-differential-pressure-value obtaining means is configured to set an upper limit for the wheel cylinder in consideration of the lock pressure (wheel cylinder pressure at which wheel lock occurs) determined on the basis of the vehicle body deceleration of the vehicle, and decrease the estimated differential pressure value when the estimated wheel cylinder pressure value at the time of start of a second-time or subsequent ABS control exceeds the upper limit.

As previously described, the wheel cylinder pressure at the time of start of ABS control is close to the lock pressure. Accordingly, when the upper limit of the wheel cylinder pressure is set to a value sufficiently larger than the lock pressure, the estimated wheel cylinder pressure value at the start of the second-time or subsequent ABS control ought not to exceed the upper limit.

Meanwhile, in some cases, there occurs a phenomenon in which the estimated wheel cylinder pressure value at the start of the second-time or subsequent ABS control exceeds the upper limit, because the above-described estimated differential pressure value is greater than the actual differential pressure. That is, if the estimated differential pressure value is greater than the actual differential pressure, the above-described "delay in starting of wheel cylinder pressure increase" occurs in the linear pressure-increasing control, and the time point at which the ABS-control start conditions are satisfied again delays. Thus, the period of the linear pressure-increasing control, in which the estimated wheel cylinder pressure value increases continuously, becomes longer. As a result, at the time of start of the next-time ABS control, the estimated wheel cylinder pressure value may exceed the upper limit despite the actual wheel cylinder pressure not exceeding the upper limit.

In view of the above, when the estimated wheel cylinder pressure value at the time of start of the second-time or subsequent ABS control exceeds the upper limit, the estimated differential pressure value must be made smaller. The above-described configuration is based on this knowledge. By virtue of this configuration, when the estimated differential pressure value becomes larger than the actual differential pressure for some reason, the estimated differential pressure value can be properly corrected to approach the actual differential pressure. Notably, the estimated differential pressure value can be made smaller by means of, for example, correcting the calculated estimated differential pressure value to a somewhat smaller value, correcting the estimated initial wheel cylinder pressure value used for calculation of the estimated differential pressure value to a somewhat smaller value, or performing a process by which the estimated wheel cylinder pressure value used for calculation of the estimated differential pressure value is calculated to become a somewhat larger value.

In the antiskid control apparatus according to the present invention, when a linear solenoid valve is used as the pressure-increasing valve (accordingly when linear pressure-increasing control is performed as the pressure-increasing control), preferably, the estimated-differential-pressure-value obtaining means is configured to set a lower limit for the wheel cylinder in consideration of the lock pressure, and increase the estimated differential pressure value when the estimated wheel cylinder pressure value at the time of start of a second-time or subsequent ABS control becomes lower than the lower limit.

As previously described, the wheel cylinder pressure at the time of start of ABS control is close to the lock pressure. Accordingly, when the lower limit of the wheel cylinder pressure is set to a value sufficiently smaller than the lock pressure, the estimated wheel cylinder pressure value at the time of start of the second-time or subsequent ABS control ought not to become lower than the lower limit.

Meanwhile, in some cases, there occurs a phenomenon in which the estimated wheel cylinder pressure value at the time of start of the second-time or subsequent ABS control becomes lower than the lower limit, because the above-described estimated differential pressure value is smaller than the actual differential pressure. That is, if the estimated differential pressure value is smaller than the actual differential pressure, the above-described "abrupt increase in wheel cylinder pressure" occurs in the linear pressure-increasing control, and the time point at which the ABS-control start conditions are satisfied again becomes earlier. Thus, the period of the linear pressure-increasing control, in which the estimated wheel cylinder pressure value increases continuously, becomes shorter. As a result, at the time of start of the next-time ABS control, the estimated wheel cylinder pressure value may become lower than the lower limit despite the actual wheel cylinder pressure not becoming lower than the lower limit.

In view of the above, when the estimated wheel cylinder pressure value at the time of start of the second-time or subsequent ABS control becomes lower than the lower limit, the estimated differential pressure value must be made larger. The above-described configuration is based on this knowledge. By virtue of this configuration, when the estimated differential pressure value becomes smaller than the actual differential pressure for some reason, the estimated differential pressure value can be properly corrected to approach the actual differential pressure. Notably, the estimated differential pressure value can be made larger by means of, for example, correcting the calculated estimated differential pressure value to a somewhat larger value, correcting the estimated initial wheel cylinder pressure value used for calculation of the estimated differential pressure value to a somewhat larger value, or performing a process by which the estimated wheel cylinder pressure value used for calculation of the estimated differential pressure value is calculated to become somewhat smaller.

In the antiskid control apparatus according to the present invention, when a linear solenoid valve is used as the pressure-increasing valve (accordingly when linear pressure-increasing control is performed as the pressure-increasing control), preferably, the estimated-differential-pressure-value obtaining means includes hunting-phenomenon determination means for determining whether or not a predetermined hunting phenomenon currently occurs in relation to rational speed of the wheel, and increases the estimated differential pressure value by a predetermined amount when the predetermined hunting phenomenon is determined to currently occur.

When the driver increases the brake operation amount during the ABS control (e.g., when the driver additionally depresses the brake pedal), the master cylinder pressure (accordingly, the actual differential pressure) also increases by an amount corresponding to the increase in the brake operation amount. In this case, the estimated differential pressure value having been set to a value close to the actual differential pressure so far becomes smaller than the actual differential pressure, and, as in the case of the above-described "case where the estimated wheel cylinder pressure value becomes smaller than the lower limit," the "abrupt increase in wheel cylinder pressure" may occur in the linear pressure-increasing control. As a result, a phenomenon (hunting phenomenon) in which the wheel speed abruptly increases and decreases at short intervals may occur.

In order to stop such a hunting phenomenon in relation to the wheel speed, the estimated differential pressure value must be set to a somewhat larger value. The above-described configuration is based on this knowledge. By virtue of this configuration, when a hunting phenomenon occurs in relation to the wheel speed because the brake operation amount is increased by the driver during the ABS control, the estimated differential pressure value can be properly corrected to approach the actual differential pressure. As a result, the hunting phenomenon in relation to the wheel speed can be stopped.

Notably, the estimated differential pressure value can be made larger by means of, for example, correcting the calculated estimated differential pressure value to increase by a predetermined amount, or correcting the estimated initial wheel cylinder pressure value used for calculation of the estimated differential pressure value to increase by a predetermined amount. Further, the hunting-phenomenon determination means is configured to determine that the above-described hunting phenomenon occurs when the time-differentiated value of the wheel rotational speed (wheel acceleration) is less than a predetermined value (negative value) at the start of the ABS control and the period of the linear pressure-increase control having been performed so far is less than a predetermined time.

In this case, the hunting-phenomenon determination means is configured to determine whether or not a predetermined hunting phenomenon occurs in relation to rotational speed of the wheel every time the ABS control is started, and the estimated-differential-pressure-value obtaining means is configured such that the amount by which the estimated differential pressure value is increased is increased by a predetermined amount every time the hunting phenomenon is determined to currently occur.

If the increase in the driver's brake operation amount during the ABS control is larger, there may occur a case in which even after the estimated differential pressure value is increased by the predetermined amount, the estimated differential pressure value is still smaller than the actual differential pressure, and the above-described hunting phenomenon does not stop after that. In such a case, the amount by which the estimated differential pressure value is increased must be increased further. The above-described configuration is based on this knowledge. By virtue of this configuration, until the above-described hunting phenomenon stops, the amount by which the estimated differential pressure value is increased can be increased by a predetermined amount every time the ABS control is started, whereby the above-described hunting phenomenon can be finally stopped without fail.

In this case, preferably, the estimated-differential-pressure-value obtaining means is configured such that the amount by which the estimated differential pressure value is increased is reduced during a period between a predetermined time point in the pressure-increasing control and the end of the pressure-increasing control, and after a time point at which the predetermined hunting phenomenon is determined not to currently occur, the amount by which the estimated differential pressure value is increased is maintained at the value at that time point.

By virtue of this configuration, the estimated differential pressure value (accordingly, the actual differential pressure) at the time point at which the predetermined hunting phenomenon is determined not to currently occur can be precisely estimated and obtained, and the estimated differential pressure value can be maintained at a precise value even after that time point.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

Figure 1:
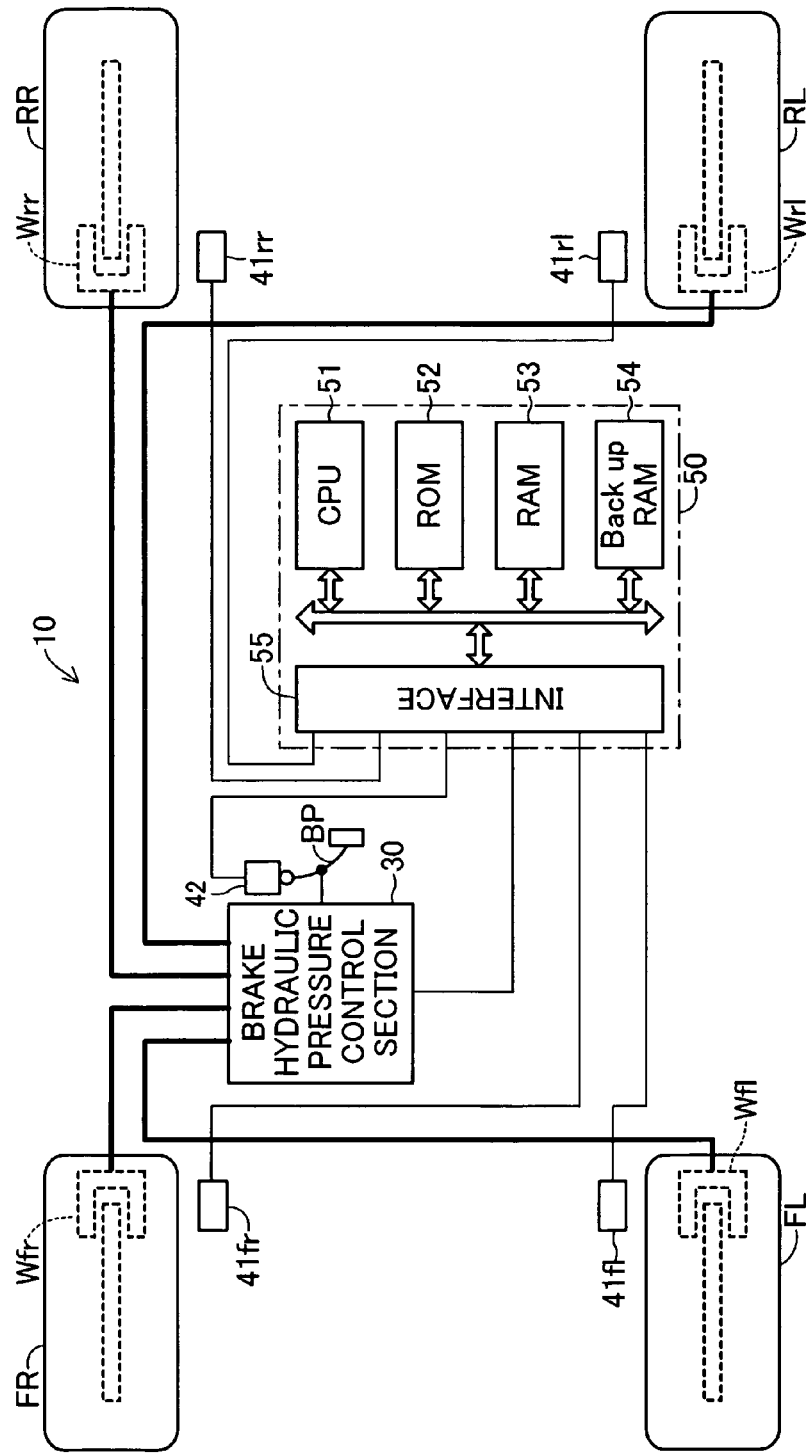
FIG. 1 is a schematic diagram of a vehicle equipped with a vehicle motion control apparatus including an antiskid control apparatus according to an embodiment of the present invention.

An antiskid control apparatus for a vehicle according to an embodiment of the present invention will be described with reference to the drawings. FIG. 1 schematically shows the structure of a vehicle equipped with a vehicle motion control apparatus 10 including a brake hydraulic pressure control section according to the embodiment of the present invention. The illustrated vehicle is a four-wheel, rear-wheel drive (FR) vehicle having two front wheels (a front left wheel FL and a front right wheel FR), which are non-driven wheels (follower wheels), and two rear wheels (a rear left wheel RL and a rear right wheel RR), which are driven wheels.

Figure 2:
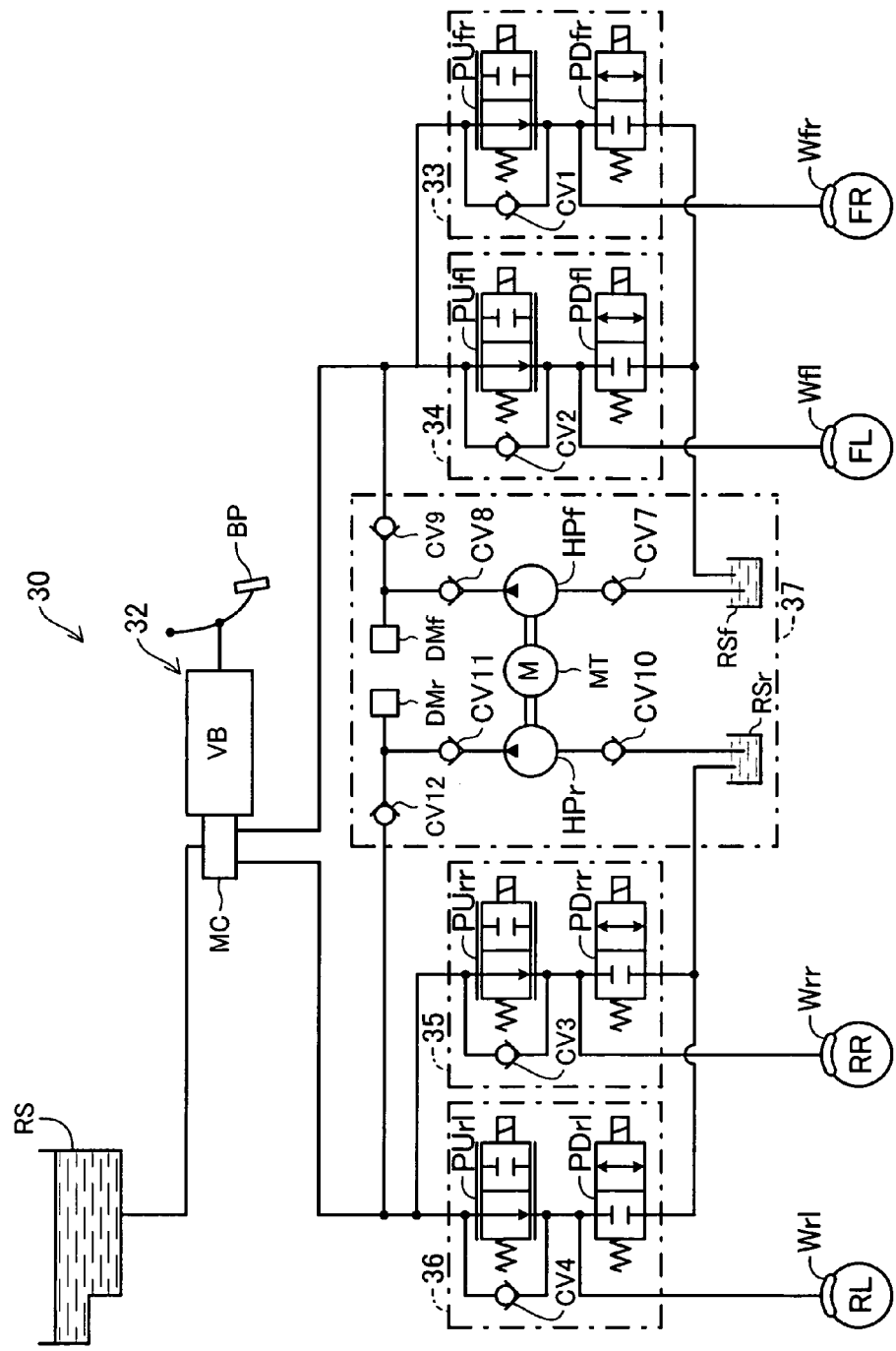
FIG. 2 is a schematic diagram of a brake hydraulic pressure control section shown in FIG. 1.

This vehicle motion control apparatus 10 includes a brake hydraulic pressure control section 30 for generating braking force in each wheel by means of brake hydraulic pressure. As schematically shown in FIG. 2, the brake hydraulic pressure control section 30 includes a brake hydraulic pressure generating section 32 which generates brake hydraulic pressure corresponding to the operating force of a brake pedal BP; an FR brake hydraulic pressure adjusting section 33, an FL brake hydraulic pressure adjusting section 34, an RR brake hydraulic pressure adjusting section 35, and an RL brake hydraulic pressure adjusting section 36, which can adjust the brake hydraulic pressures supplied to corresponding wheel cylinders Wfr, Wfl, Wrr, and Wrl respectively installed on the wheels FR, FL, RR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB.

The FR brake hydraulic pressure adjusting section 33 consists of a pressure-increasing valve PUfr, which is a normally-open linear solenoid valve, and a pressure-reducing valve PDfr, which is a normally-closed on-off solenoid valve of a 2-port, 2-position type. When the pressure-reducing valve PDfr is in its closed state (a state corresponding to a non-excited state (OFF)) shown in FIG. 2, it breaks communication between the wheel cylinder Wfr and a reservoir RSf. When the pressure-reducing valve PDfr is in its open state (a state corresponding to an excited state (ON)), it establishes the communication between the wheel cylinder Wfr and the reservoir RSf.

The valve body of the pressure-increasing valve PUfr always receives force in the opening direction stemming from urging force of an unillustrated coil spring, and also receives force in the opening direction stemming from the differential pressure (the above-described actual differential pressure)

between the master cylinder pressure and the wheel cylinder pressure and force in the closing direction stemming from attraction force which increases in proportion to current supplied to the pressure-increasing valve PUfr (i.e., instruction current Id).

Figure 3:
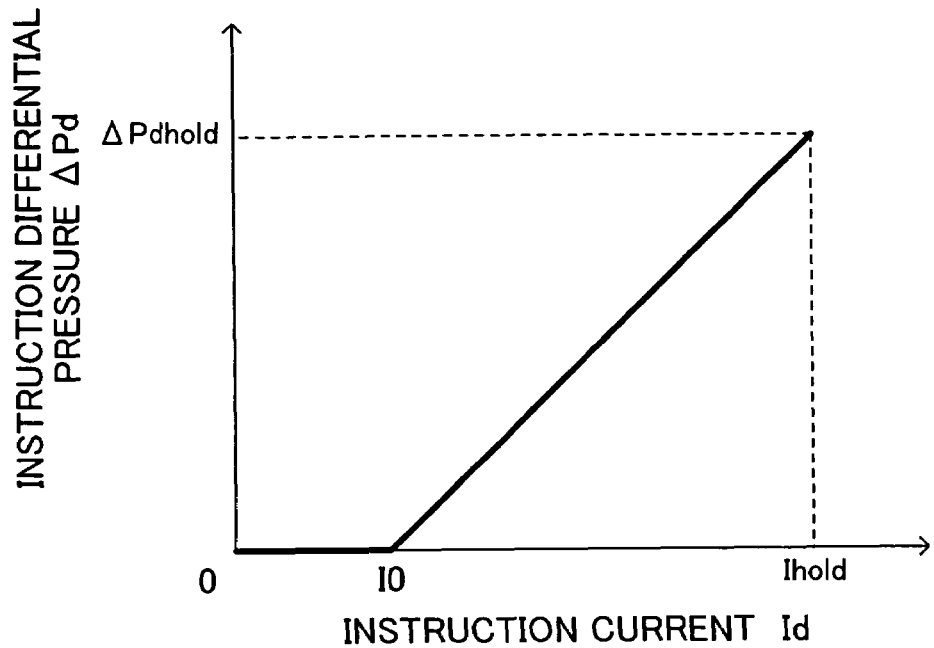
FIG. 3 is a graph showing a relationship between instruction current and instruction differential pressure for a pressure-increasing valve shown in FIG. 2.

As a result, as shown in FIG. 3, a differential pressure (instruction differential pressure ΔPd) corresponding to the attraction force is determined such that it increases in proportion to the instruction current Id. In FIG. 3, 10 represents a current corresponding to the urging force of the coil spring. When the instruction differential pressure ΔPd is greater than the actual differential pressure (i.e., when the instruction current Id is greater than the actual-differential-pressure corresponding current), the pressure-increasing valve PUfr is closed to break the communication between the upstream side of the FR brake hydraulic pressure adjusting section 33 and the wheel cylinder Wfr. Meanwhile, when the instruction differential pressure ΔPd is smaller than the actual differential pressure (i.e., when the instruction current Id is smaller than the actual-differential-pressure corresponding current), the pressure-increasing valve PUfr is opened to establish communication between the upstream side of the FR brake hydraulic pressure adjusting section 33 and the wheel cylinder Wfr. As a result, the brake fluid at the upstream portion of the FR brake hydraulic pressure adjusting section 33 flows into the wheel cylinder Wfr, whereby the actual differential pressure decreases and coincides with the instruction differential pressure ΔPd.

In other words, the actual differential pressure (its allowable maximum value) can be controlled in accordance with the instruction current Id supplied to the pressure-increasing valve PUfr. Further, when the pressure-increasing valve PUfr is brought into the non-excited state (i.e., when the instruction current Id is set to "0"), the pressure-increasing valve PUfr holds its open state by the urging force of the coil spring. Moreover, the instruction current Id is set to a value (for example, a valve-closed-state maintaining current value Ihold, see FIG. 3) corresponding to an instruction differential pressure ΔPdhold that is sufficiently greater than the maximum value of the differential pressure that can be generated as the actual differential pressure, whereby the pressure-increasing valve PUfr holds its closed state.

Thus, when the instruction current Id supplied to the pressure-increasing valve PUfr is gradually decreased from the actual-differential-pressure corresponding current at this point with the pressure-reducing valve PDfr closed, the actual differential pressure gradually decreases, with the result that the brake hydraulic pressure (wheel cylinder pressure) in the wheel cylinder Wfr gently increases. The control which linearly increases the wheel cylinder pressure in this manner will be referred to as "linear pressure-increasing control."

Further, when the pressure-reducing valve PDfr is closed with the pressure-increasing valve PUfr kept closed, regardless of the hydraulic pressure in the upstream side of the FR brake hydraulic pressure adjusting section 33, the wheel cylinder pressure at the present moment is maintained. The control which holds the wheel cylinder pressure in this manner will be referred to as "pressure-holding control."

Further, when the pressure-reducing valve PDfr is opened with the pressure-increasing valve PUfr kept closed, the brake fluid in the wheel cylinder Wfr is returned to the reservoir RSf, thereby reducing the wheel cylinder pressure. The control which reduces the wheel cylinder pressure in this manner will be referred to as "pressure-reducing control." Thus, the linear pressure-increasing control, the pressure-holding control, and the pressure-reducing control can be performed to control the brake hydraulic pressure in the wheel cylinder Wfr (wheel cylinder pressure).

A check valve CV1 which allows flow of the brake fluid in only one direction from the wheel cylinder Wfr side to the upstream side of the FR brake hydraulic pressure adjusting section 33 is connected in parallel with the pressure-increasing valve PUfr. With this structure, when the brake pedal BP is released after being operated, the brake hydraulic pressure in the wheel cylinder Wfr is rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively.

The return brake fluid supply section 37 includes a DC motor MT, and two hydraulic pumps HPf and HPr simultaneously driven by the motor MT. The hydraulic pump HPf pumps, via a check valve CV7, the brake fluid returned from the pressure reducing values PDfr and PDfl to the reservoir RSf, and supplies the pumped brake fluid to the upstream sides of the FR brake hydraulic pressure adjusting section 33 and the FL brake hydraulic pressure adjusting section 34 via check valves CV8 and CV9.

Similarly, the hydraulic pump HPr pumps, via a check valve CV10, the brake fluid returned from the pressure reducing values PDrr and PDrl to the reservoir RSr, and supplies the pumped brake fluid to the upstream sides of the RR brake hydraulic pressure adjusting section 35 and the RL brake hydraulic pressure adjusting section 36 via check valves CV11 and CV12.

With the structure described above, when all the solenoid valves are in their non-excited states, the brake hydraulic pressure control section 30 supplies to each wheel cylinder a brake hydraulic pressure (i.e., master cylinder pressure) corresponding to the operating force of the brake pedal BP. In this state, only the brake hydraulic pressure in a certain wheel cylinder can be reduced from the master cylinder pressure by a prescribed amount through control of a certain pressure-increasing valve PU and a certain pressure-reducing valve PD. That is, the brake hydraulic pressure control section 30 can individually decrease the wheel cylinder pressure of each wheel from the master cylinder pressure.

Referring back to FIG. 1, the vehicle motion control apparatus 10 includes wheel speed sensors 41fl, 41fr, 41rl, and 41rr which each output a signal having a pulse each time the corresponding wheel rotates by a prescribed angle; a brake switch 42 that outputs ON-signal (High signal) or OFF-signal (Low signal) according to whether the brake pedal BP is operated or not; and an electronic controller 50.

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to the wheel speed sensors 41 and the brake switch 42. The interface 55 supplies to the CPU 51 signals from the wheel speed sensors 41 and the brake switch 42. Further, in accordance with instructions from the CPU 51, the interface 55 sends driving signals to the solenoid valves (pressure-increasing valve PU and pressure-reducing valve PD) and the motor MT of the brake hydraulic pressure control section 30. Thus, the CPU 51 operates as a pressure-increasing-valve control means for controlling the pressure-increasing valve PU during the pressure-increasing control. As described in more detail below, the CPU 51 or pressure-increasing-valve control means controls the pressure-increasing valve PU during the pressure-increasing control on the basis of the estimated differential pressure value.

In the following description, the symbol "" appended to various variables and the like collectively represents the symbols fl, fr, rl, and rr and indicates that the particular variable or the like applies to all of the wheels FR, FL, etc. of the vehicle. For example, the pressure-increasing valve PU collectively indicates the pressure-increasing valve PUfl for the front left wheel, the pressure-increasing valve PUfr for the front right wheel, the pressure-increasing valve PUrl for the rear left wheel, and the pressure-increasing valve PUrr for the rear right wheel.

Figure 4:
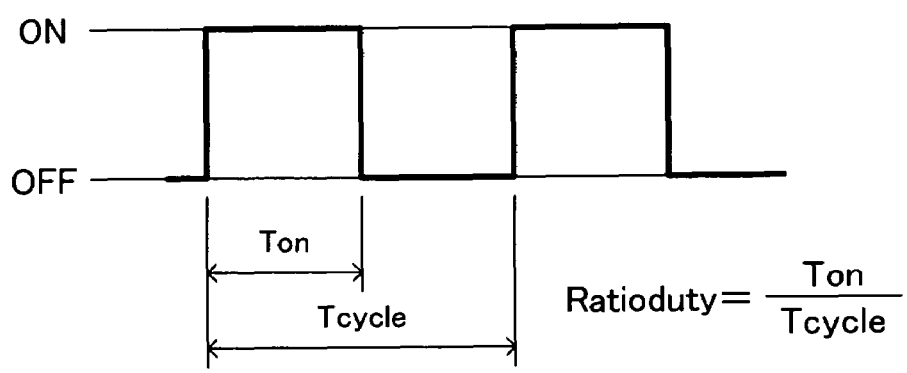
FIG. 4 is a view showing a current-supply pattern used when the instruction current shown in FIG. 3 is controlled by means of duty control.

The instruction current Id supplied to the pressure-increasing valve PU (supply current value) is controlled by the CPU 51. Specifically, as shown in FIG. 4, the CPU 51 adjusts the ratio of a time Ton over which current is supplied to the pressure-increasing valve PU to a single cycle time Tcycle (i.e., duty ratio Ratioduty=(Ton/Tcycle)), thereby adjusting the average (effective) current (=instruction current Id). As a result, by individually adjusting the duty ratio Ratioduty for the respective wheels, the instruction current Id applied to each wheel can be linearly changed individually.

The brake hydraulic pressure control section 30 (CPU 51) explained above executes an antiskid control (ABS control), which will be described later, in order that slip of a wheel(s) caused by a driver's operation on the brake pedal BP does not become excessive.

Outline of ABS Control

Figure 5:
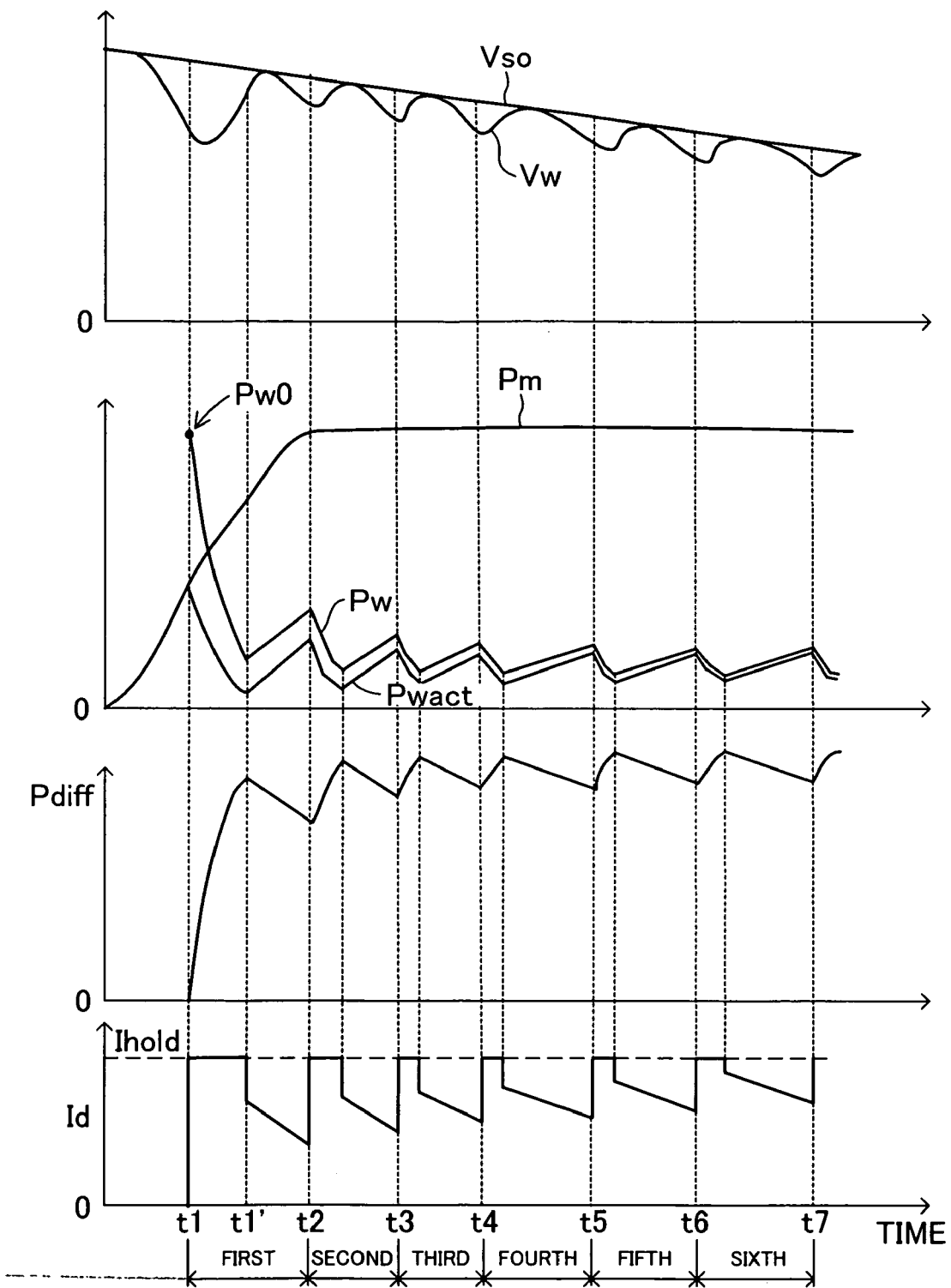
FIG. 5 is a time chart showing example changes in vehicle body speed, wheel speed, master cylinder pressure, actual wheel cylinder pressure, estimated wheel cylinder pressure value, estimated differential pressure value, and instruction current supplied to the pressure-increasing valve that is a linear solenoid valve in a case where ABS control is started and executed by the antiskid control apparatus shown in FIG. 1.

FIG. 5 is a time chart showing example changes in vehicle body speed Vso, wheel speed Vw, master cylinder pressure Pm, actual wheel cylinder pressure Pwact, estimated wheel cylinder pressure value Pw which will be described later, estimated differential pressure value Pdiff which will be described later, and instruction current Id supplied to the pressure-increasing valve PU, which is a linear solenoid valve, when the driver of the vehicle operates the brake pedal BP so that the ABS control is started and executed by the present apparatus at time t1.

In this case, since the ABS control is not executed before time t1, as shown in FIG. 5 the actual wheel cylinder pressure Pwact becomes equal to the master cylinder pressure Pm at time t1. At time t1, the ABS control start conditions are satisfied, so that the present apparatus starts the pressure-reducing control (pressure-increasing valve PU: closed (instruction current Id: Ihold), pressure-reducing valve PD: open). As a result, a first-time control cycle (first-time ABS control) is started and the actual wheel cylinder pressure Pwact starts to decrease. The ABS control start conditions in this example are "SLIP>SLIP1 and DVw<−DVw1."

Here, SLIP is the amount of slip of the wheel. The slip amount SLIP is represented by the following Eq. 1. In Eq. 1, Vso is vehicle body speed. In this example, it is the maximum value of the wheel speeds Vw. DVw is wheel acceleration (i.e., a time-differentiated value of the wheel speed Vw) for the wheel**. SLIP1 and DVw1 are predetermined constants.

$$SLIP = Vso - Vw \quad (1)$$

Subsequently, at time t1', the pressure-increasing control start conditions are satisfied, so that the present apparatus starts the linear pressure-increasing control successively after the pressure-reducing control. The pressure-increasing control start conditions in this example are "SLIP<SLIP2." SLIP2 (<SLIP1) is a predetermined constant. During the linear pressure-increasing control, the pressure-reducing valve PD is maintained in its closed state. Further, as will be described later, in the linear pressure-increasing control, the estimated differential pressure value Pdiff, which is repeatedly estimated and updated so as to coincide with the actual differential pressure at and after the time of start of the first-time ABS control, is used as an instruction differential pressure ΔPd. On the basis of the map shown in FIG. 3** and the estimated differential pressure value Pdiff, the instruction current Id supplied to the pressure-increasing valve PU is repeatedly determined and changed.

With this operation, as shown in FIG. 5, the instruction current Id also linearly decreases with the estimated differential pressure value Pdiff, which decreases linearly throughout the linear pressure-increasing control. As a result, the actual wheel cylinder hydraulic Pwact increases.

The present apparatus continuously performs this linear pressure-increasing control until the above-described ABS control start conditions are satisfied again (that is, until a second-time ABS control is started). Then at time t2, the above-described ABS control start conditions are satisfied again, so that the present apparatus stops the linear pressure-increasing control that is currently being executed and ends the first-time ABS control. At the same time, the present apparatus starts and executes the second-time ABS control, which is composed of the pressure-reducing control and the linear pressure-increasing control, by the same procedure as in the first-time ABS control.

Subsequently, so long as the above-described ABS control end conditions are not satisfied, each time the ABS control start conditions are satisfied (at times t3, t4, t5, t6, t7 in FIG. 5), the present apparatus starts and executes a next-time ABS control cycle, which is composed of the pressure-reducing control and the linear pressure-increasing control, by the same procedure as in the first-time ABS control cycle. The above is the outline of the ABS control.

Estimated Differential Pressure Value Pdiff

Next will be described the estimated differential pressure value Pdiff which is used to determine the instruction current Id supplied to the pressure-increasing valve PU during the linear pressure-increasing control. This estimated differential pressure value Pdiff is the estimated value of the differential pressure (=actual differential pressure) between the master cylinder pressure Pm and the wheel cylinder pressure, and in this example, is repeatedly calculated and updated in accordance with the following Eq. 2 after the first-time ABS control is started (time t1 in FIG. 5) until when the above-described ABS control end conditions are satisfied.

$$Pdiff = (Pw0 - Pw) + Pup1 + Pup2 \quad (2)$$

In the above Eq. 2, Pw0 represents an estimated initial wheel cylinder pressure value which is an estimated value of the wheel cylinder pressure at the start of the first-time ABS control. Pw represents an estimated value of the wheel cylinder pressure which changes throughout the ABS control and whose initial value is Pw0. Pup1 and Pup2 are differential pressure addition values, and will be described later. Here, the estimated initial wheel cylinder pressure value Pw0 corresponds to the "first value". The estimated wheel cylinder pressure value Pw corresponds to the "second value". The estimated differential pressure value Pdiff corresponds to the "third value". "a first reducing state" corresponds to a period during the pressure-reducing control of the first-time ABS control. "an increasing state" corresponds to a period during the linear pressure-increasing control.

In general, the master cylinder pressure Pm during the ABS control is considered to change within a range close to the wheel cylinder pressure at the start of the first-time ABS control. Thus, the differential pressure (the above-described actual differential pressure) between the master cylinder pressure Pm and the wheel cylinder pressure during the ABS control is considered to change within a range close to the difference (Pw0−Pw) between the estimated initial wheel cylinder pressure value Pw0 and the estimated wheel cylinder pressure value Pw. The above Eq. 2 (other than Pup1 and Pup2) is based on these findings. First, the method of setting the estimated initial wheel cylinder pressure value Pw0 in Eq. 2 will be described.

<Estimated Initial Wheel Cylinder Pressure Value Pw0>

When the wheel cylinder pressure is gradually increased during vehicle travel and reaches a certain pressure, wheel lock occurs. In the following description, this pressure is referred to as "lock pressure Pg." The lock pressure Pg is generally proportional to the road-surface frictional coefficient μ.

Meanwhile, vehicle body deceleration DVso at the time when lock occurs is generally proportional to the road-surface frictional coefficient μ. The vehicle body deceleration DVso is obtained by inverting the sign of a time-differentiated value of the vehicle body speed Vso. The vehicle body deceleration DVso is used after undergoing low-pass filter processing which is performed for eliminating noise or the like. From the above, the lock pressure Pg is generally proportional to the vehicle body deceleration DVso, and can be obtained in accordance with the following Eq. 3. Here, Kg is a constant of proportion (fixed value).

$$Pg = Kg \cdot DVso \tag{3}$$

Figure 6:
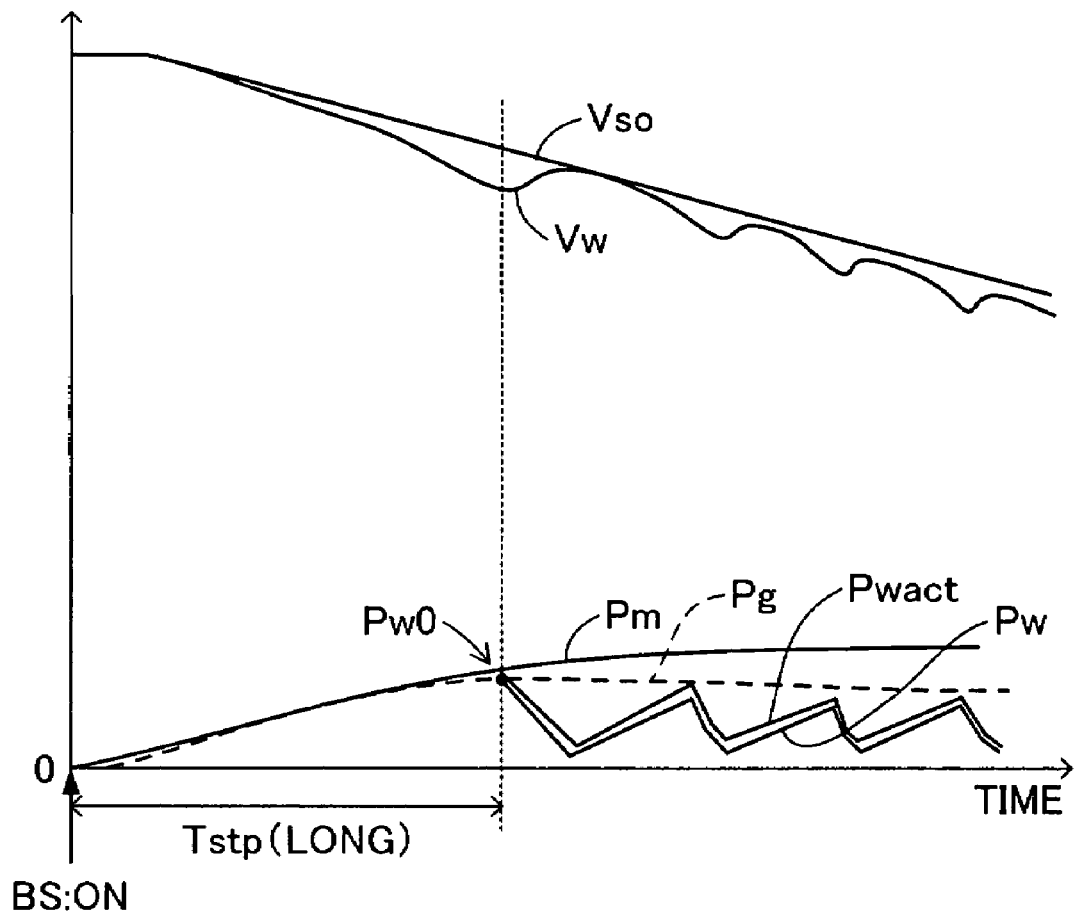
FIG. 6 is a view for facilitating the understanding about the setting of estimated initial wheel cylinder pressure value in a case where slow braking is performed on low μ road-surface.
Figure 7:
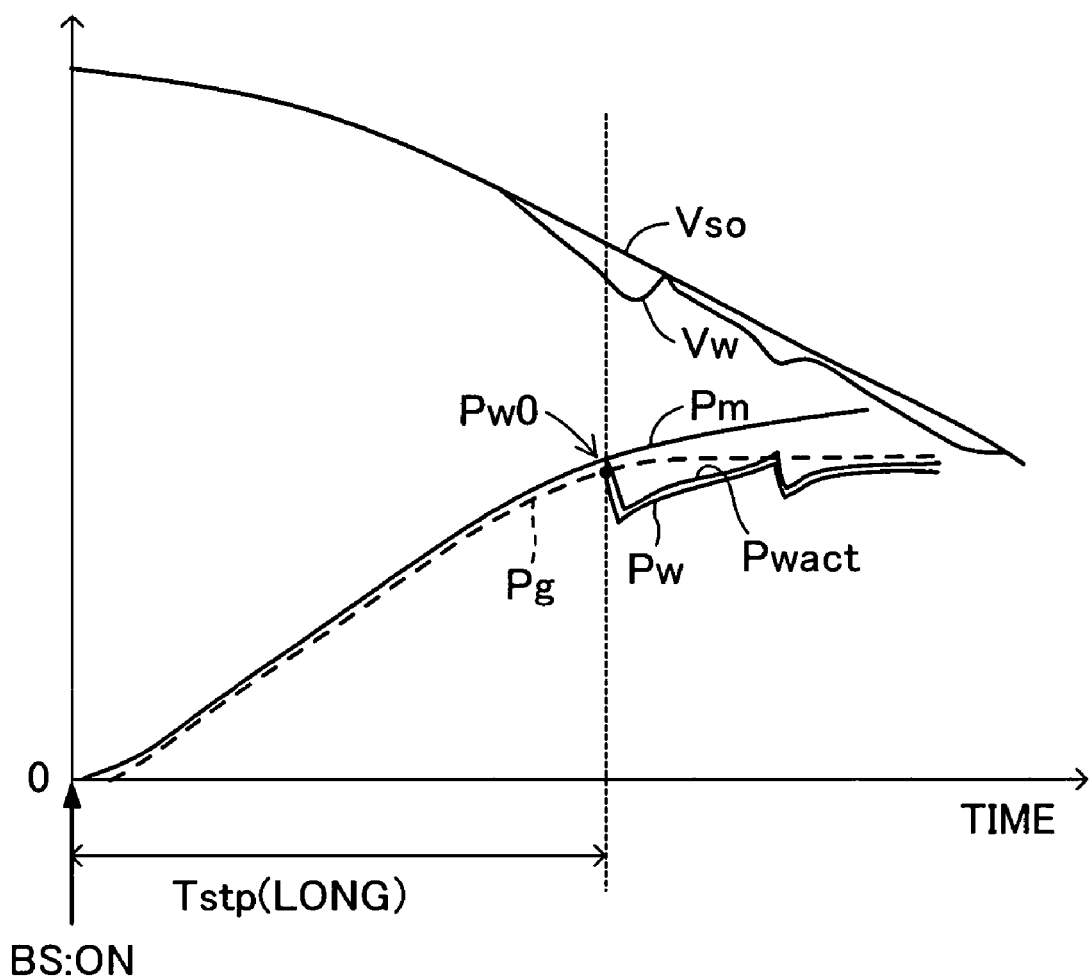
FIG. 7 is a view for facilitating the understanding about the setting of the estimated initial wheel cylinder pressure value in a case where the slow braking is performed on high μ road-surface.

As shown in FIG. 6 and FIG. 7, when the time between start of operation of the brake pedal BP (brake switch 42: ON) and start of the (first-time) ABS control (that is, brake operation time before start of ABS control Tstp) is relatively long (hereinafter referred to as "in the case of slow braking"), the master cylinder pressure Pm (=the actual wheel cylinder pressure Pwact) tends to generally coincide with the lock pressure Pg calculated in accordance with the above Eq. 3 over the brake operation time before start of ABS control Tstp, regardless of whether the road-surface frictional coefficient μ is small ("low μ") or large ("high μ"). Therefore, in the case of slow braking, when the estimated initial wheel cylinder pressure value Pw0 is set so as to coincide with the lock pressure Pg calculated in accordance with Eq. 3 using the vehicle body deceleration DVso at the time of start of the first-time ABS control, the estimated initial wheel cylinder pressure value Pw0 can be estimated with high accuracy.

Figure 8:
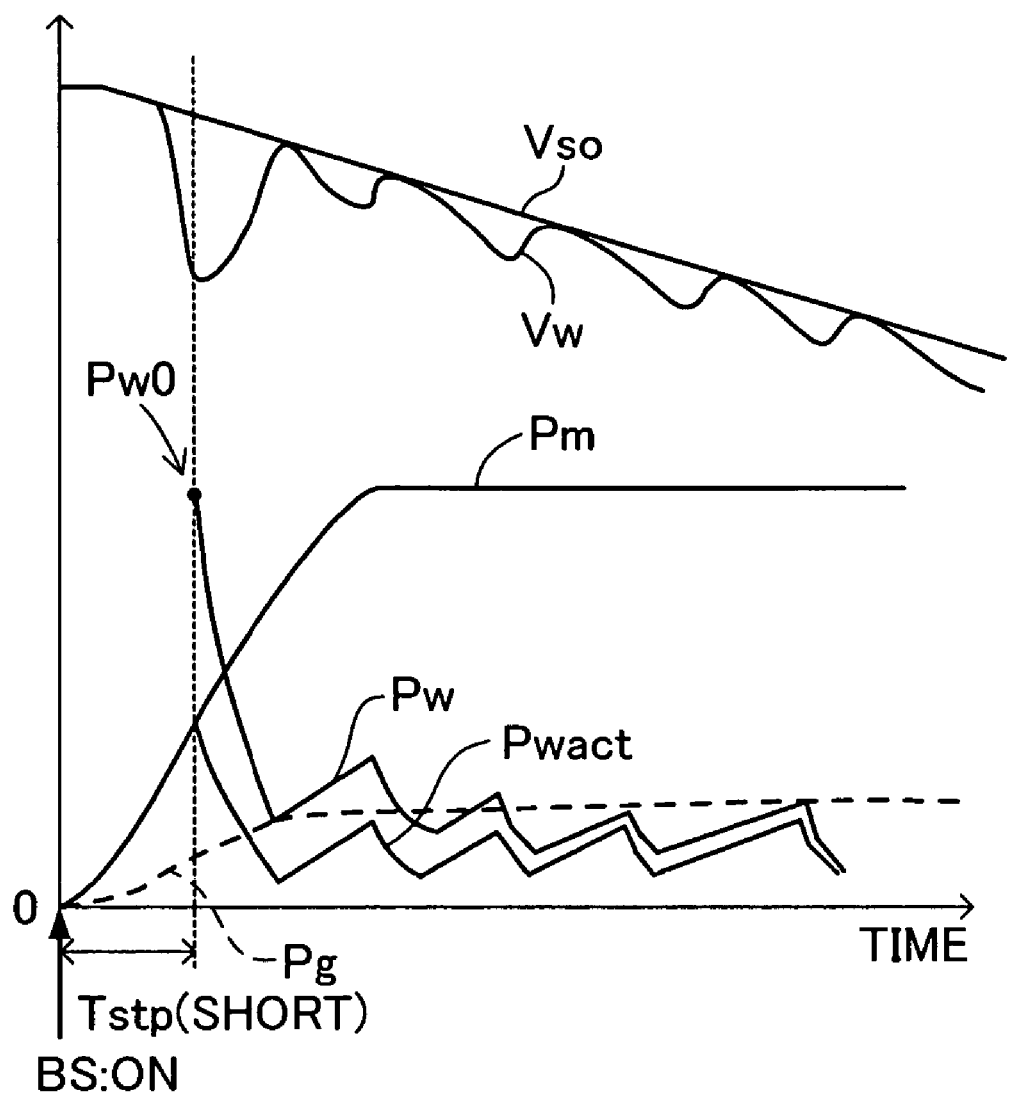
FIG. 8 is a view for facilitating the understanding about the setting of the estimated initial wheel cylinder pressure value in a case where rapid braking is performed on the low μ road-surface.
Figure 9:
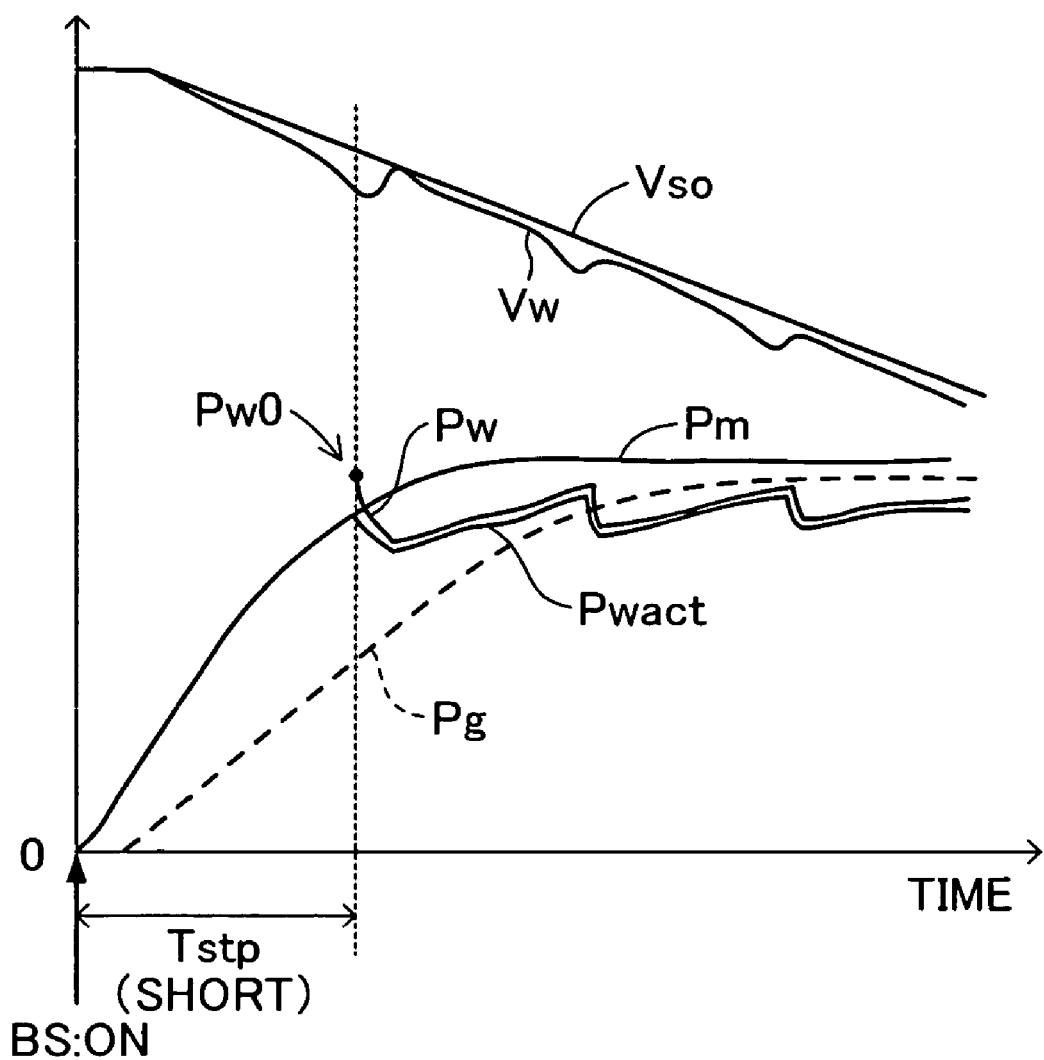
FIG. 9 is a view for facilitating the understanding about the setting of the estimated initial wheel cylinder pressure value in a case where the rapid braking is performed on the high μ road-surface.

Meanwhile, as shown in FIG. 8 and FIG. 9, when the brake operation time before start of ABS control Tstp is relatively short (hereinafter referred to as "in the case of rapid braking"); that is, when the actual vehicle body deceleration increases rapidly, the vehicle body deceleration Dvso follows the actual vehicle body deceleration with some delay caused by the above-described low-pass filtering. Thus, the vehicle body deceleration Dvso becomes somewhat smaller than the actual vehicle body deceleration. As a result, since the lock pressure Pg which is calculated in accordance with Eq. 3 becomes a somewhat smaller value, this value tends to become smaller than the master cylinder pressure Pm (=the actual wheel cylinder pressure Pwact) over the brake operation time before start of ABS control Tstp.

Therefore, as in the case of slow braking, the estimated initial wheel cylinder pressure value Pw0 is obtained as having a somewhat smaller value in the case of rapid braking as well, if the estimated initial wheel cylinder pressure value Pw0 is set so as to coincide with the lock pressure Pg which is calculated in accordance with Eq. 3 using the vehicle body deceleration DVso at the start of the first-time ABS control. Therefore, the faster the brake operation triggering the ABS control; that is, the shorter the brake operation time before start of ABS control Tstp, the greater the value to which the estimated initial wheel cylinder pressure value Pw0 must be corrected. Here, the estimated initial wheel cylinder pressure value Pw0 is obtained as a value equal to the lock pressure Pg calculated in accordance with Eq. 3.

From the above, the present apparatus uses two maps. One is the map shown in FIG. 10 which defines the relationship between the vehicle body deceleration DVso and the value of PG1. The other is the map shown in FIG. 11 which defines the relationship between the brake operation time before start of ABS control Tstp and the value of PG2.

Figure 10:
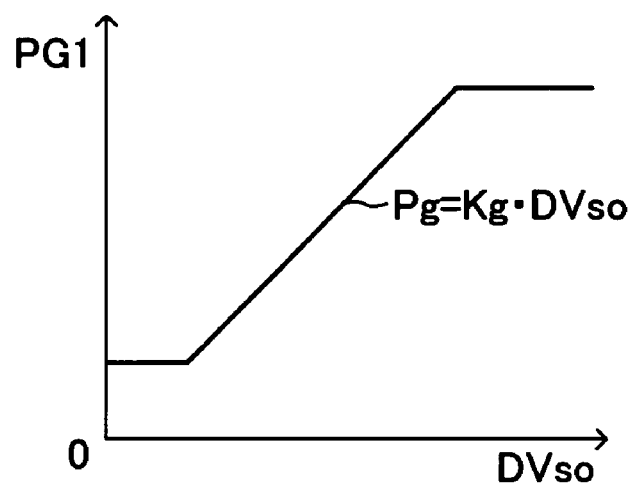
FIG. 10 is a graph showing a relationship between vehicle body deceleration and value of PG1 which is taken into consideration when the estimated initial wheel cylinder pressure value is set.

According to the map shown in FIG. 10, the value of PG1 becomes equal to the lock pressure Pg calculated in accordance with Eq. 3 (a value proportional to the vehicle body deceleration DVso) between the predetermined lower and upper limits. Here, the upper and lower limits correspond to the lock pressures Pg in high μ and in low μ, respectively.

Figure 11:
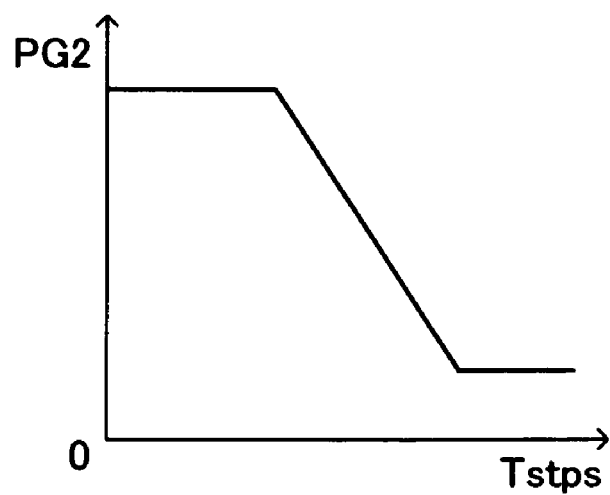
FIG. 11 is a graph showing a relationship between brake operation time before start of ABS control and value of PG2 which is taken into consideration when the estimated initial wheel cylinder pressure value is set.

Meanwhile, according to the map shown in FIG. 11, the shorter the brake operation time before the start of ABS control Tstp, the greater the value of PG2 between the predetermined upper and lower limits. The upper and lower limits shown in FIG. 11 are equal to the upper and lower limits shown in FIG. 10, respectively.

The present apparatus uses, as the estimated initial wheel cylinder pressure value Pw0, the larger one of the values of PG1 and PG2 which are obtained at the start of the first-time ABS control. As a result, when the brake operation time before start of ABS control Tstp is long (that is, in the case of slow braking), the value of PG1 is greater than the value of PG2 and the estimated initial wheel cylinder pressure value Pw0 is set to become equal to the lock pressure Pg calculated in accordance with Eq. 3.

Meanwhile, when the brake operation time before start of ABS control Tstp is short (that is, in the case of rapid braking), the value of PG1 is smaller than the value of PG2 and the estimated initial wheel cylinder pressure value Pw0 is set to a value greater than the lock pressure Pg calculated in accordance with Eq. 3. As a result, in the case of rapid braking, even in low μ, the estimated initial wheel cylinder pressure value Pw0 is set to a value corresponding to the lock pressure Pg in high μ. This is based on the fact that in the case of rapid braking in low μ, the master cylinder pressure Pm increases continuously over a relatively long period from the start of the first-time ABS control (see FIG. 8), and therefore the estimated differential pressure value Pdiff can be obtained precisely by setting the estimated initial wheel cylinder pressure value Pw0 to a somewhat larger value.

In this manner, the present apparatus can precisely estimate and obtain the estimated initial wheel cylinder pressure value Pw0 needed to precisely obtain the estimated differential pressure value Pdiff, regardless of whether or not the brake operation triggering the start of the ABS control is performed rapidly, and independently of the road-surface frictional coefficient μ.

<Estimated Wheel Cylinder Pressure Value Pw>

Next, the method of calculating the estimated wheel cylinder pressure value Pw in the above Eq. 2 will be described. As described above, upon start of the first-time ABS control, calculation of the estimated wheel cylinder pressure value Pw is initiated (see FIG. 5), whereby at the start of the first-time ABS control, the estimated wheel cylinder pressure value Pw is set to the above-described estimated initial wheel cylinder pressure value Pw0.

Figure 12:
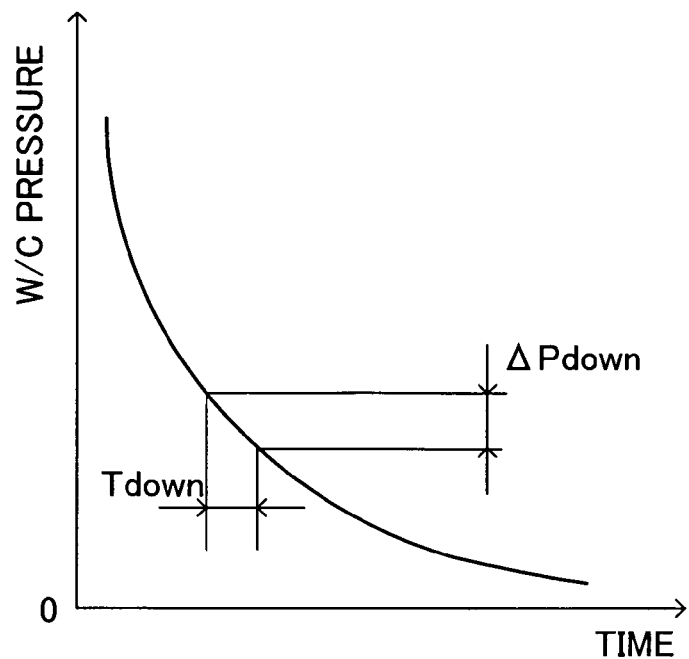
FIG. 12 is a graph showing a decrease in wheel cylinder pressure with time for a case where a pressure-reducing valve is maintained in its open state.
Figure 13:
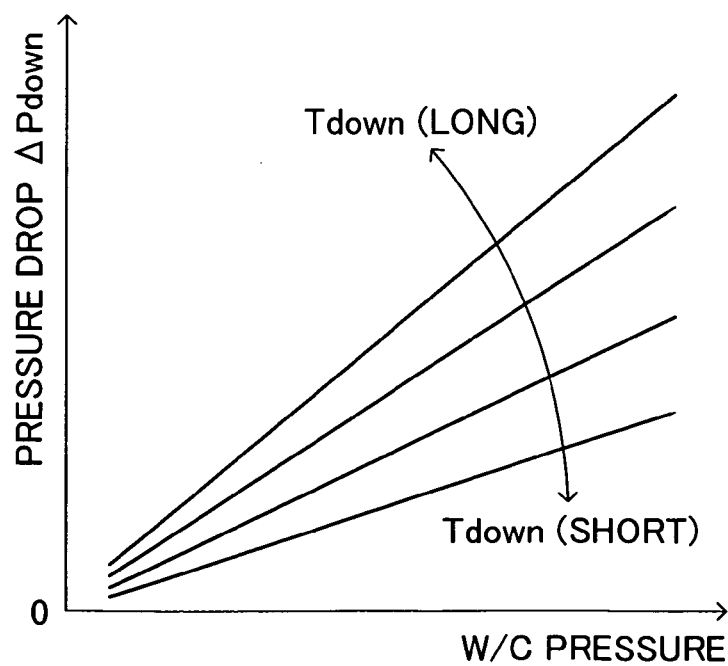
FIG. 13 is a graph showing a relationship among valve-opened-state maintaining time, wheel cylinder pressure, and wheel cylinder pressure drop amount for a case where the pressure-reducing valve is maintained in its open state.

When the first-time ABS control is started, the pressure-reducing control is first performed. Here, as shown in FIG. 12 and FIG. 13, pressure drop ΔPdown of the wheel cylinder pressure (hereinafter may be referred to as "W/C pressure") caused by operation of the pressure-reducing valve PD during the pressure-reducing control is determined from the wheel cylinder pressure itself and time Tdown during which the pressure-reducing valve PD is maintained in its open state. Assuming that the time Tdown is constant, the pressure drop ΔPdown is proportional to the wheel cylinder pressure itself. Such a pressure-reducing characteristic provided by the pressure-reducing valve PD can be previously obtained through a predetermined experiment, simulation, or the like.

The present apparatus uses the pressure drop amount ΔPdown obtained from the map in FIG. 13 to determine the estimated wheel cylinder pressure value Pw decreasing from the estimated initial wheel cylinder pressure value Pw0 throughout the above-described pressure-reducing control (see times t1 to t1' in FIG. 5). With this operation, the estimated differential pressure value Pdiff calculated in accordance with Eq. 2 increases from "0."

After the above-described pressure-reducing control is ended, the linear pressure-increasing control is executed successively. In the linear pressure-increasing control, the rising gradient of the wheel cylinder pressure during the control is previously set (designed) to a proper value. Therefore, throughout the linear pressure-increasing control, the present apparatus determines the estimated the wheel cylinder pressure value Pw which increases at a constant gradient from the wheel cylinder pressure value Pw at the end of the pressure-reducing control (see times t1' to t2 in FIG. 5). With this operation, the estimated differential pressure value Pdiff calculated in accordance with Eq. 2 decreases from the value at the end of the pressure-reducing control.

In this manner, by setting the estimated wheel cylinder pressure value Pw (=the estimated initial wheel cylinder pressure value Pw0) at the start of the first-time ABS control, the estimated wheel cylinder pressure value Pw, which changes throughout the first-time ABS control, can be repeatedly obtained. Therefore, the estimated wheel cylinder pressure value Pw, which changes throughout the second-time ABS control, can be obtained in a manner similar to that for the first-time ABS control (see times t2 to t3 in FIG. 5), by setting the estimated wheel cylinder pressure value Pw at the start of the second-time ABS control (that is, the start of the pressure-reducing control) to a value equal to the estimated wheel cylinder pressure value Pw at the end of the linear pressure-increasing control in the first-time ABS control.

The estimated wheel cylinder pressure value Pw in a third-time ABS control or subsequent ABS control can be successively obtained by repeatedly performing the above-described steps. By virtue of these steps, the present apparatus can repeatedly obtain the estimated wheel cylinder pressure value Pw, which changes throughout the ABS control continuously executed a plurality of times, while utilizing the estimated initial wheel cylinder pressure value Pw0. As a result, the estimated differential pressure value Pdiff calculated in accordance with Eq. 2 can also be estimated and obtained repeatedly on the basis of the estimated wheel cylinder pressure value Pw (see FIG. 5).

When the estimated wheel cylinder pressure value Pw is estimated by the above-described method, as shown in FIG. 5, even if the estimated initial wheel cylinder pressure value Pw0 is set to a value somewhat deviating from the actual wheel cylinder pressure Pwact at the start of the first-time ABS control, the estimated wheel cylinder pressure value Pw gradually approaches the actual wheel cylinder pressure Pwact with the elapse of time. The reason for this will be described below.

That is, as described above, the estimated wheel cylinder pressure value Pw during the pressure-reducing control is estimated from the pressure drop amount ΔPdown which is obtained from the map shown in FIG. 13. The higher the wheel cylinder pressure, the higher the pressure drop amount ΔPdown. Therefore, for example, as shown in FIG. 5, when the estimated wheel cylinder pressure value Pw is greater than the actual wheel cylinder pressure Pwact, the total drop of the estimated wheel cylinder pressure value Pw throughout the pressure-reducing control becomes greater than the total drop of the actual wheel cylinder pressure Pwact throughout the pressure-reducing control. As a result, each time the pressure-reducing control is repeatedly executed during repeated execution of the ABS control, the estimated wheel cylinder pressure value Pw gradually approaches the actual wheel cylinder pressure Pwact.

Meanwhile, when the estimated wheel cylinder pressure value Pw is smaller than the actual wheel cylinder pressure Pwact, the total drop in the estimated wheel cylinder pressure value Pw throughout the pressure-reducing control becomes smaller than the total drop in the actual wheel cylinder pressure Pwact throughout the pressure-reducing control. Therefore, as in the above case, each time the pressure-reducing control is repeatedly executed during repeated execution of the ABS control, the estimated wheel cylinder pressure value Pw gradually approaches the actual wheel cylinder pressure Pwact.

In this manner, when the estimated wheel cylinder pressure value Pw is estimated by the above-described method, even if the estimated initial wheel cylinder pressure value Pw0 is set to a value somewhat deviating from the actual wheel cylinder pressure Pwact at the start of the first-time ABS control, the estimated wheel cylinder pressure value Pw can be estimated precisely thereafter.

<Differential Pressure Additional Value Pup1>

Figure 14:
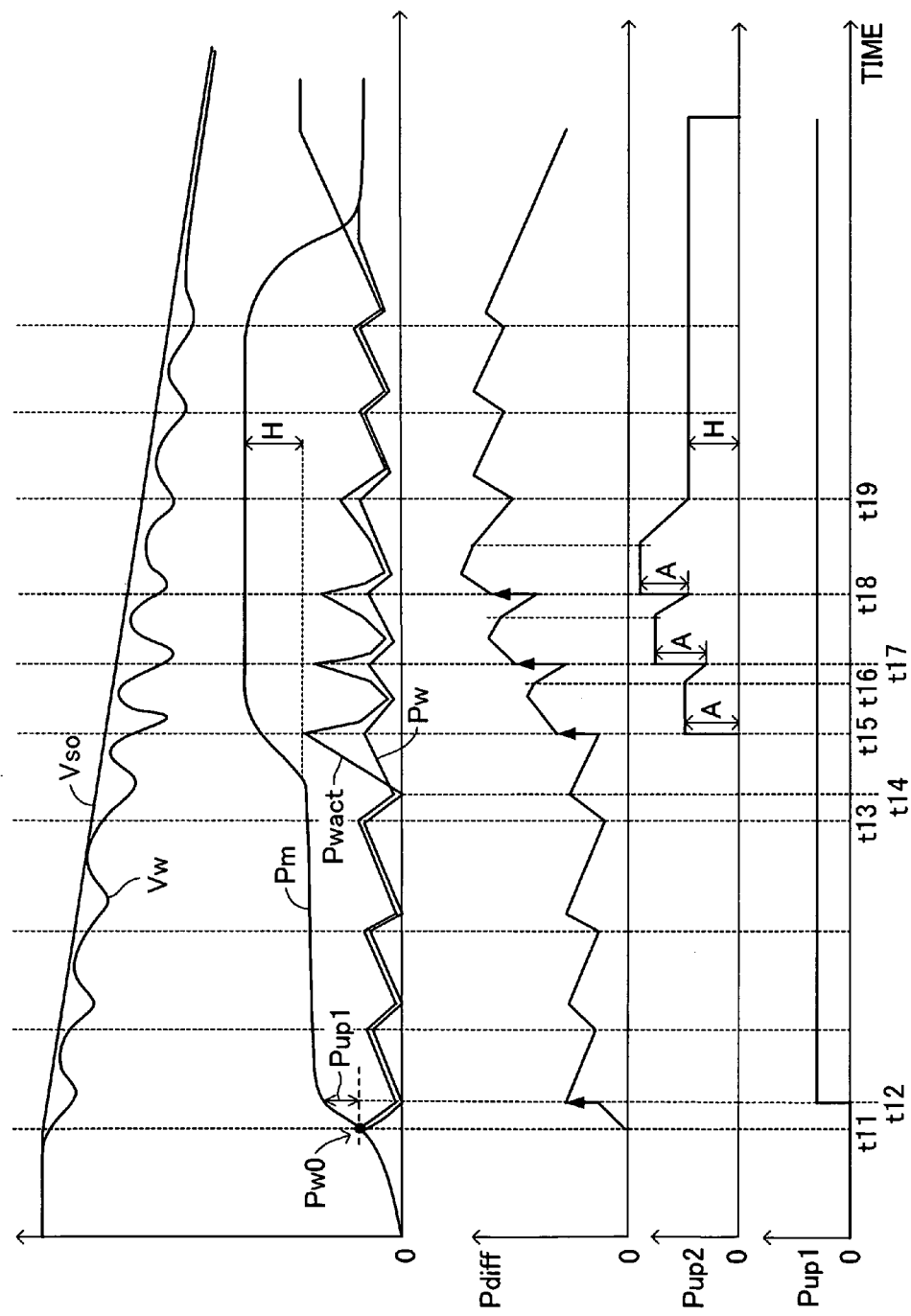
FIG. 14 is a time chart showing example changes in the vehicle body speed, the wheel speed, the master cylinder pressure, the actual wheel cylinder pressure, the estimated wheel cylinder pressure value, the estimated differential pressure value, and the differential pressure addition value in the case where the ABS control is started and executed by the antiskid control apparatus shown in FIG. 1.

Next, the differential pressure addition value Pup1 in the above Eq. 2 will be described with reference to FIG. 14. FIG. 14 is a time chart showing example changes in the vehicle body speed Vso, the wheel speed Vw, the master cylinder pressure Pm, the actual wheel cylinder pressure Pwact, the estimated wheel cylinder pressure value Pw, the estimated differential pressure value Pdiff, and the differential pressure addition values Pup2 and Pup1, when a driver of the vehicle operates the brake pedal BP so that the ABS control is started and executed by the present apparatus from time t11.

It was previously described that the master cylinder pressure Pm during the ABS control changes within a range close to the wheel cylinder pressure (=the master cylinder pressure Pm) at the start of the first-time ABS control. Actually, as shown in FIG. 14, the master cylinder pressure Pm often increases from the wheel cylinder pressure at the time of start of the first-time ABS control, over a short period (times t11 to t12) from the time of start of the first-time ABS control. This amount of increase in the master cylinder pressure Pm is defined as the differential pressure addition value Pup1.

That is, the master cylinder pressure Pm during the ABS control often changes in the vicinity of a value which is obtained by adding the differential pressure addition value Pup1 to the above-described estimated initial wheel cylinder pressure value Pw0. Thus, in order to obtain the estimated differential pressure value Pdiff more precisely, as shown in the above Eq. 2, the estimated differential pressure value Pdiff is preferably set to a value which is obtained by adding the differential pressure addition value Pup1 to the value (Pw0−Pw). Meanwhile, this differential pressure addition value Pup1 tends to increase as the brake operation time before start of ABS control Tstp decreases, and can be obtained from the map shown in FIG. 15 which defines the relationship between the brake operation time before start of ABS control Tstp and the differential pressure addition value Pup1, and the brake operation time before start of ABS control Tstp.

From the above, the present apparatus initializes the differential pressure addition value Pup1 to 0 at the time of start of the first-time ABS control (time t11 in FIG. 14). Further, at the time of start of the linear pressure-increasing control in the first-time ABS control (time t12 in FIG. 14); that is, at the time when use of the estimated differential pressure value Pdiff is started so as to determine the instruction current Id supplied to the pressure-increasing valve PU, the present apparatus changes the differential pressure addition value Pup1 ($\geqq 0$) to a value obtained from the map of FIG. 15.

Figure 15:
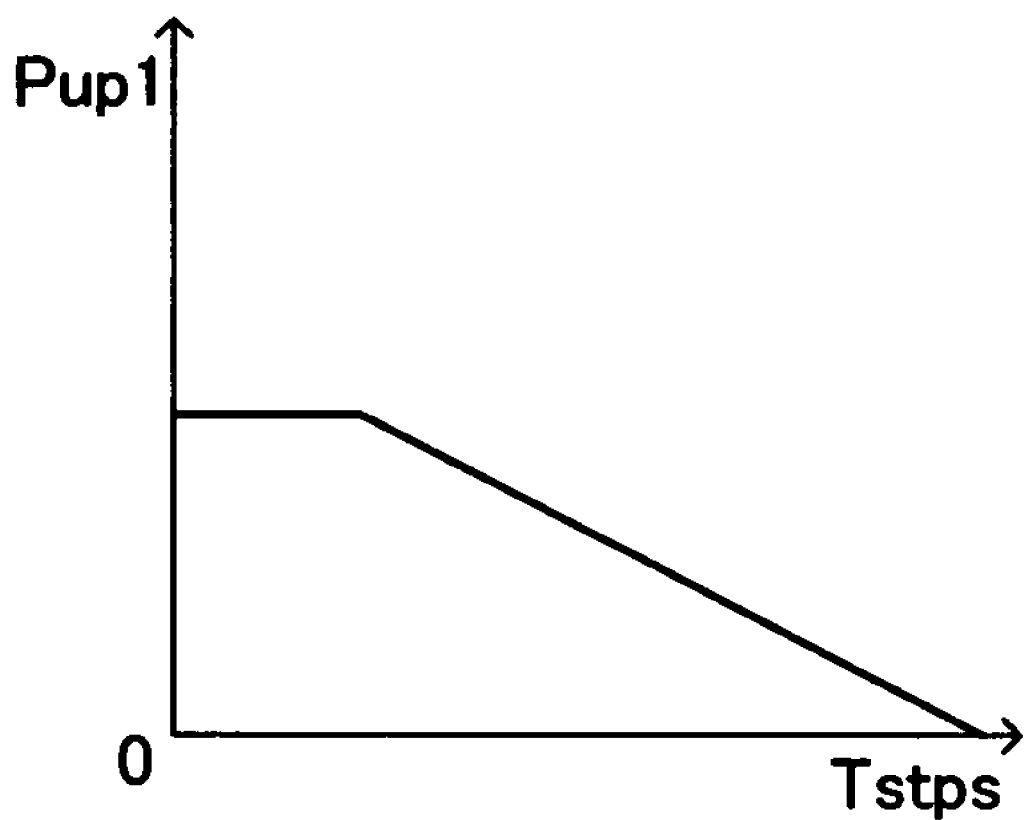
FIG. 15 is a graph showing a relationship between differential pressure addition value and the brake operation time before start of ABS control.

Thus, the estimated differential pressure value Pdiff calculated in accordance with the above Eq. 2 is set to a value greater by the differential pressure addition value Pup1 determined from the map in FIG. 15, from the start of the linear pressure-increasing control in the first-time ABS control. As a result, even though the brake operation triggering the ABS control is performed rapidly, the estimated differential pressure value Pdiff can be precisely estimated and obtained.

<Differential Pressure Additional Value Pup2>

Next, the differential pressure addition value Pup2 in the above Eq. 2 will be described with reference to FIG. 14. FIG. 14 shows the case where the driver additionally depresses the brake pedal BP (hereinafter referred to as "additional brake operation") at a certain time during execution of a fourth-time ABS control (times t13 to t15). Here, an increase in the master cylinder pressure Pm due to the additional brake operation is defined as H.

In this case, the estimated differential pressure value Pdiff, which has been set to a value close to the actual differential pressure so far, becomes smaller than the actual differential pressure after the additional brake operation is performed. As a result, the above-described "sudden rise in the wheel cylinder pressure (Pwact)" occurs during the linear pressure-increasing control (times t14 to t15) in the fourth-time ABS control, and the point (time t15) at which the ABS control start conditions are satisfied again becomes earlier.

Thus, after the linear pressure-increasing control is ended within a short period, the pressure-reducing control in a fifth-time ABS control is started immediately. As a result, as shown in FIG. 14, a phenomenon in which the wheel speed Vw sharply increases and decreases at short intervals (hereinafter, referred to as "hunting phenomenon") occurs. In order to avoid such hunting phenomenon, the estimated differential pressure value Pdiff must be set to a somewhat larger value. A value added to the estimated differential pressure value Pdiff for this purpose is defined as a differential pressure addition value Pup2 ($\geqq 0$).

In view of the above, the present apparatus determines whether the hunting phenomenon occurs each time the second-time or subsequent ABS control is started (for example, at times t13, t15, t17, t18, and t19 in FIG. 14). In the present example, it is determined that the hunting phenomenon occurs when conditions "DVw<−DVw2 and Tup<T1" are satisfied. Here, Tup represents the duration of the previously executed liner pressure-increasing control. DVw2 and T1 are predetermined constants.

The present apparatus increments the differential pressure addition value Pup2 (initial value: 0) by a value A (a constant) each time it determines that a hunting phenomenon occurs (see times t15, t17, and t18 in FIG. 14). Further, when the differential pressure addition value Pup2 is greater than "0," the present apparatus gradually decreases the differential pressure addition value Pup2 over a period between a predetermined time point in the linear pressure-increasing control and the end of this linear pressure-increasing control (for example, see times t16 to t17 during the linear pressure-increasing control in the fifth-time ABS control).

At and after the time the present apparatus determines that no hunting phenomenon occurs (at and after time t19 in FIG. 14), the present apparatus maintains the differential pressure addition value Pup2 at the value at that time point. The differential pressure addition value Pup2 is set and changed in this manner, whereby the estimated differential pressure value Pdiff calculated in accordance with Eq. 2 is set to be greater by the differential pressure addition value Pup2 during a period of time when the differential pressure addition value Pup2 is greater than 0 (after time t15 in FIG. 14).

This operation can reliably stop the hunting phenomenon. Further, the differential pressure addition value Pup2 maintained after the time when it is determined that the hunting phenomenon does not occur (after time t19 in FIG. 14), becomes a value close to the above-described increase amount H of the master cylinder pressure Pm due to the driver's additional operation of the brake pedal BP. Thus, the estimated differential pressure value Pdiff at the time when it is determined that the hunting phenomenon does not occur can be precisely estimated and obtained, and after that, the estimated differential pressure value Pdiff can be maintained at a precise value.

<Setting Upper Limit and Lower Limit of Estimated Wheel Cylinder Pressure Value>

Figure 16:
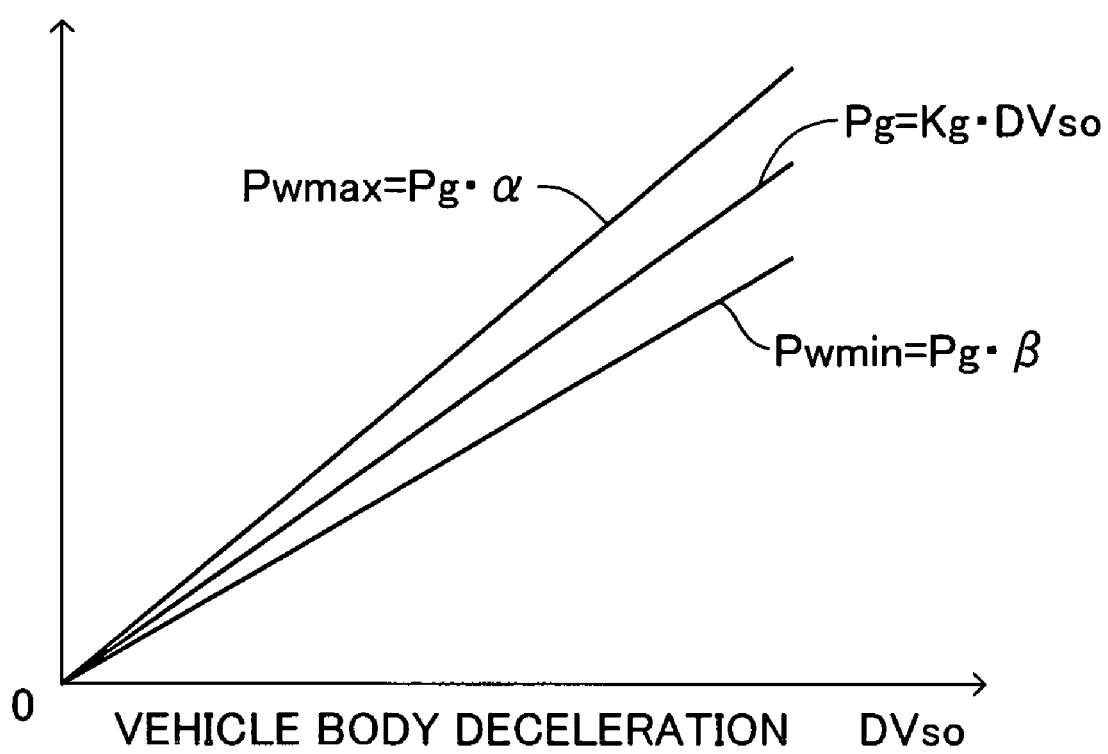
FIG. 16 is a graph showing a relationship between an upper limit of the wheel cylinder pressure and a lower limit of the wheel cylinder pressure.

As described above, the wheel cylinder pressure at the time of start of the ABS control becomes a value close to the lock pressure Pg (=Kg·DVso). Therefore, the estimated wheel cylinder pressure value Pw at the time when the second-time or subsequent ABS control is started should fall within a predetermined range including the lock pressure Pg. Here, as shown in FIG. 16, for example, the upper limit Pwmax of this range is set to a value obtained by multiplying the lock pressure Pg by a predetermined value $\alpha$ ($1<\alpha$; for example, $\alpha=1.2$). The lower limit Pwmin of this range is set to a value obtained by multiplying the lock pressure Pg by a predetermined $\beta$ ($0<\beta<1$; for example, $\beta=0.8$). Notably, the upper limit Pwmax and the lower limit Pwmin are preferably set in consideration of variations in vehicle load and brake effectiveness (specifically, the frictional coefficient between a brake pad and a disk rotor).

Figure 17:
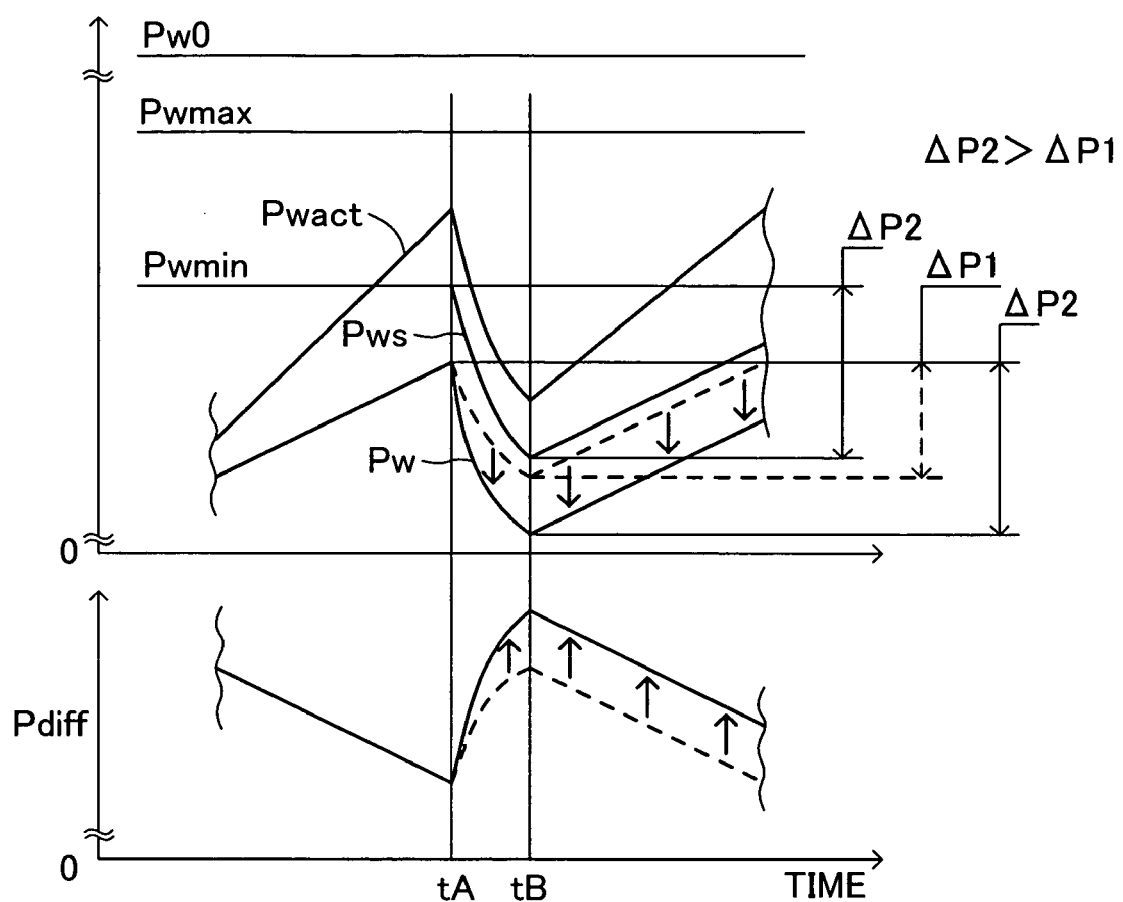
FIG. 17 is a view for describing a method of calculating the estimated differential pressure value to be rather larger, in a case where the estimated wheel cylinder pressure value falls below the lower limit of the wheel cylinder pressure.

Meanwhile, as shown in FIG. 17, in some cases, the estimated wheel cylinder pressure value Pw at the time TA of start of the second-time or subsequent ABS control becomes smaller than the lower limit Pwmin. This is because the estimated differential pressure value Pdiff is smaller than the actual differential pressure. That is, when the estimated differential pressure value Pdiff is smaller than the actual differential pressure, the above-described "sudden rise in the wheel cylinder pressure (Pwact)" occurs in the linear pressure-increasing control, whereby the time point at which the ABS control start conditions are again satisfied becomes earlier (at time TA in FIG. 17). Thus, the period of the linear pressure-increasing control during which the estimated wheel cylinder pressure value Pw continuously increases becomes shorter. As a result, at the time of start of the next ABS control, even though the actual wheel cylinder pressure Pwact does not fall below the lower limit Pwmin, the estimated wheel cylinder pressure value Pw may fall below the lower limit Pwmin.

In view of the above, when the estimated wheel cylinder pressure value Pw at the start of the second-time or subsequent ABS control becomes smaller than the lower limit Pwmin, the estimated differential pressure value Pdiff must be increased. Here, a possible method for increasing the estimated differential pressure value Pdiff is to perform a process by which the estimated wheel cylinder pressure value Pw, which is used in Eq. 2 for calculating the estimated differential pressure value Pdiff, is calculated to be somewhat smaller.

Specifically, in the possible method, as shown in FIG. 17, a reduced amount of the estimated wheel cylinder pressure value Pw throughout the pressure-reducing control (times TA to TB) executed from the time (time TA) of the start of the ABS control is determined on the basis of (hypothetical) wheel cylinder pressure for control Pws which decreases from the lower limit Pwmin during the pressure-reducing control (times TA to TB), and the map shown in FIG. 13, instead of obtaining the estimated wheel cylinder pressure value Pw itself and the map shown in FIG. 13.

That is, as described above, the higher the wheel cylinder pressure, the greater the pressure drop ΔPdown obtained from the map shown in FIG. 13. If the pressure drop in the estimated wheel cylinder pressure value Pw during the pressure-reducing control (times TA to TB) is obtained on the basis of the estimated wheel cylinder pressure value Pw itself and the map shown in FIG. 13, the estimated wheel cylinder pressure value Pw decreases along the broken line. Therefore, the total drop in the estimated wheel cylinder pressure value Pw throughout the pressure-reducing control Meanwhile, if the pressure-drop in the estimated wheel cylinder pressure value Pw during the pressure-reducing control (times TA to TB) is obtained on the basis of the wheel cylinder pressure for control Pws, which is higher than the estimated wheel cylinder pressure value Pw, and the map shown in FIG. 13, the estimated wheel cylinder pressure value Pw greatly decrease along the solid line. Therefore, the total drop in the estimated wheel cylinder pressure value Pw throughout the pressure-reducing control eventually reaches ΔP2 (>ΔP1).

In this manner, when the pressure-drop in the estimated wheel cylinder pressure value Pw during the pressure-reducing control is determined from the wheel cylinder pressure for control Pws instead of the estimated wheel cylinder pressure value Pw itself, the estimated wheel cylinder pressure value Pw at the end of the pressure-reducing control (that is, at the start of the next linear pressure-increasing control (time TB in FIG. 17)) can be decreased. As a result, the estimated wheel cylinder pressure value Pw throughout the above-described next linear pressure-increasing control can be also calculated to be somewhat smaller.

With this process, as shown in FIG. 17, the estimated differential pressure value Pdiff calculated in accordance with the above Eq. 2 is calculated to be somewhat larger, by the amount by which the estimated wheel cylinder pressure value Pw decreases. Thus, even in the case where the estimated differential pressure value Pdiff becomes smaller than the actual differential pressure for some reason, the estimated differential pressure value Pdiff can be properly corrected so as to approach the actual differential pressure, whereby in the above described next linear pressure-increasing control (after time TB), occurrence of the above described "sudden rise in the wheel cylinder pressure (Pwact)" is suppressed. As a result, the estimated wheel cylinder pressure value Pw at the start of the next ABS control (or, at the start of a subsequent ABS control) can be reliably made greater than the lower limit Pwmin.

Figure 18:
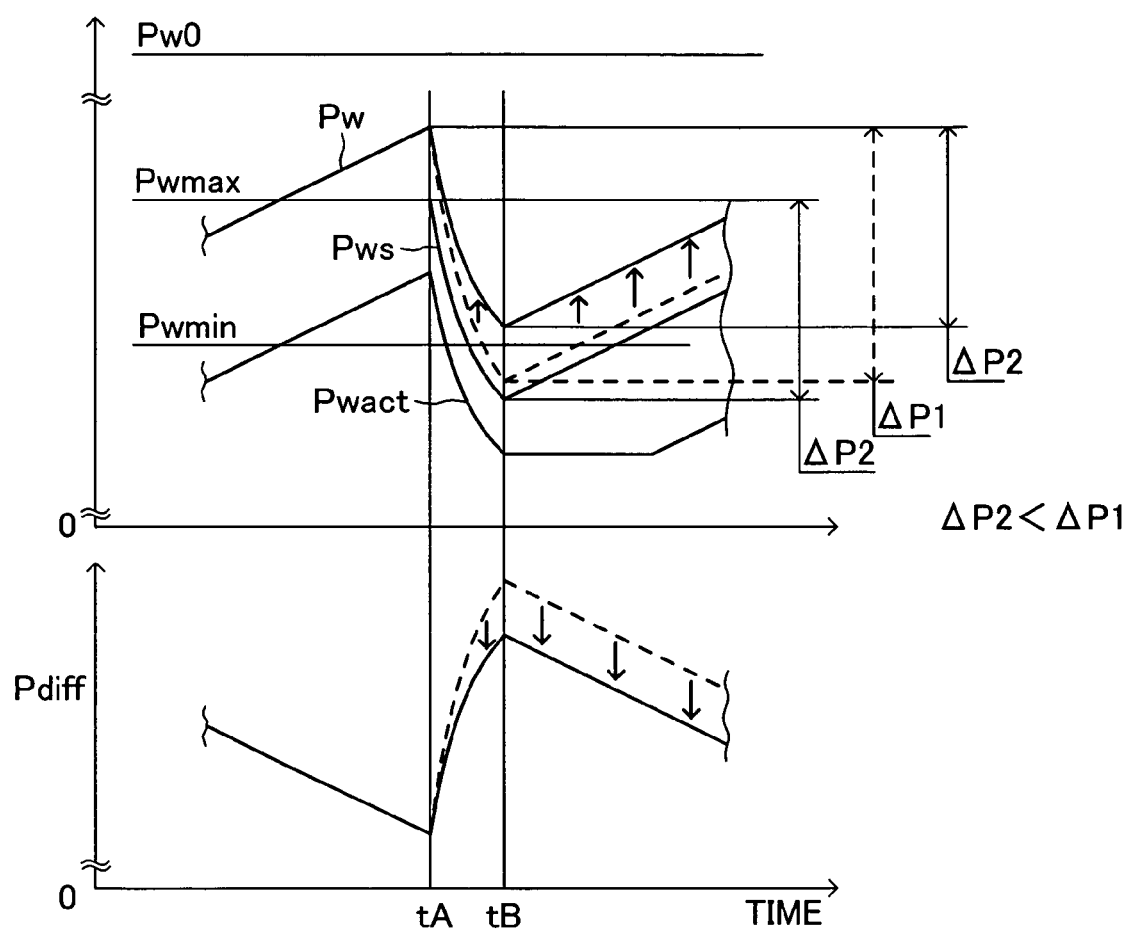
FIG. 18 is a view for describing a method of calculating the estimated differential pressure value to be rather smaller, in a case where the estimated wheel cylinder pressure value exceeds the upper limit of the wheel cylinder pressure.

Meanwhile, as shown in FIG. 18, the estimated wheel cylinder pressure value Pw at the time TA of start of the second-time or subsequent ABS control may exceed the upper limit Pwmax. This is because the estimated differential pressure value Pdiff is greater than the actual differential pressure. That is, when the estimated differential pressure value Pdiff is higher than the actual differential pressure, the above-described "delay in start of pressure-increasing of the wheel cylinder pressure (Pwact)" occurs in the linear pressure-increasing control, whereby the time point at which the ABS control start conditions are again satisfied becomes later (at time TA in FIG. 18). Thus, the period of the linear pressure-increasing control during which the estimated wheel cylinder pressure value Pw continuously increases becomes longer. As a result, at the start of the next ABS control, even though the actual wheel cylinder pressure Pwact does not exceed the upper limit Pwmax, the estimated wheel cylinder pressure value Pw may exceed the upper limit Pwmax.

From the above, when the estimated wheel cylinder pressure value Pw at the start of the second-time or subsequent ABS control exceeds the upper limit Pwmax, the estimated differential pressure value Pdiff must be decreased. Here, a possible method for decreasing the estimated differential pressure value Pdiff is to perform a process by which the estimated wheel cylinder pressure value Pw, which is used in Eq. 2 for calculating the estimated differential pressure value Pdiff, is calculated to be rather larger.

Specifically, in the possible method, as shown in FIG. 18, the drop in the estimated wheel cylinder pressure value Pw throughout the pressure-reducing control (times TA to TB) executed from the time (time TA) of the start of the ABS control is obtained on the basis of the (hypothetical) wheel cylinder pressure for control Pws which decreases from the upper limit Pwmax during the pressure-reducing control (times TA to TB), and the map shown in FIG. 13, instead of being obtained from the estimated wheel cylinder pressure value Pw itself and the map shown in FIG. 13.

That is, as described above, the higher the wheel cylinder pressure, the greater the pressure drop ΔPdown obtained from the map shown in FIG. 13. If the pressure drop in the estimated wheel cylinder pressure value Pw during the pressure-reducing control (times TA to TB) is obtained on the basis of the estimated wheel cylinder pressure value Pw itself and the map shown in FIG. 13, the estimated wheel cylinder pressure value Pw greatly decreases along the broken line. Therefore, the total drop in the estimated wheel cylinder pressure value Pw throughout the pressure-reducing control eventually reaches ΔP1.

Meanwhile, if the pressure-drop in the estimated wheel cylinder pressure value Pw during the pressure-reducing control (times TA to TB) is determined on the basis of the wheel cylinder pressure for control Pws, which is smaller than the estimated wheel cylinder pressure value Pw, and the map shown in FIG. 13, the estimated wheel cylinder pressure value Pw decreases along the solid line. Therefore, the total drop in the estimated wheel cylinder pressure value Pw throughout the pressure-reducing control eventually reaches ΔP2 (<ΔP1).

In this manner, when the pressure-drop in the estimated wheel cylinder pressure value Pw during the pressure-reducing control is determined from the wheel cylinder pressure for control Pws instead of the estimated wheel cylinder pressure value Pw itself, the estimated wheel cylinder pressure value Pw at the end of the pressure-reducing control (that is, at the start of the next linear pressure-increasing control (time TB in FIG. 18)) can be increased. As a result, the estimated wheel cylinder pressure value Pw throughout the above-described next linear pressure-increasing control can be also made somewhat larger.

With this process, as shown in FIG. 18, the estimated differential pressure value Pdiff calculated in accordance with the above Eq. 2 is calculated to be somewhat smaller by the amount by which the estimated wheel cylinder pressure value Pw increases. Thus, even in the case where the estimated differential pressure value Pdiff becomes larger than the actual differential pressure for some reason, the estimated differential pressure value Pdiff can be properly corrected so as to approach the actual differential pressure, whereby in the above described next linear pressure-increasing control (after time TB), occurrence of the above described "delay in start of pressure-increasing of the wheel cylinder pressure (Pwact)" is suppressed. As a result, the estimated wheel cylinder pressure value Pw at the start of the next ABS control (or, at the time when a subsequent ABS control is started) can be reliably made not greater than the upper limit Pwmax. The above is the outline of the calculation of the estimated differential pressure value Pdiff.

Actual Operation

The actual operation of the vehicle motion control apparatus 10 including the antiskid control apparatus according to the embodiment of the present invention having the above-described structure will be explained while referring to FIGS. 19 to 25, which show, in the form of flowcharts, routines which are executed by the CPU 51 of the electronic controller 50. The routines shown in FIGS. 19 to 25 are executed for each wheel.

Figure 19:
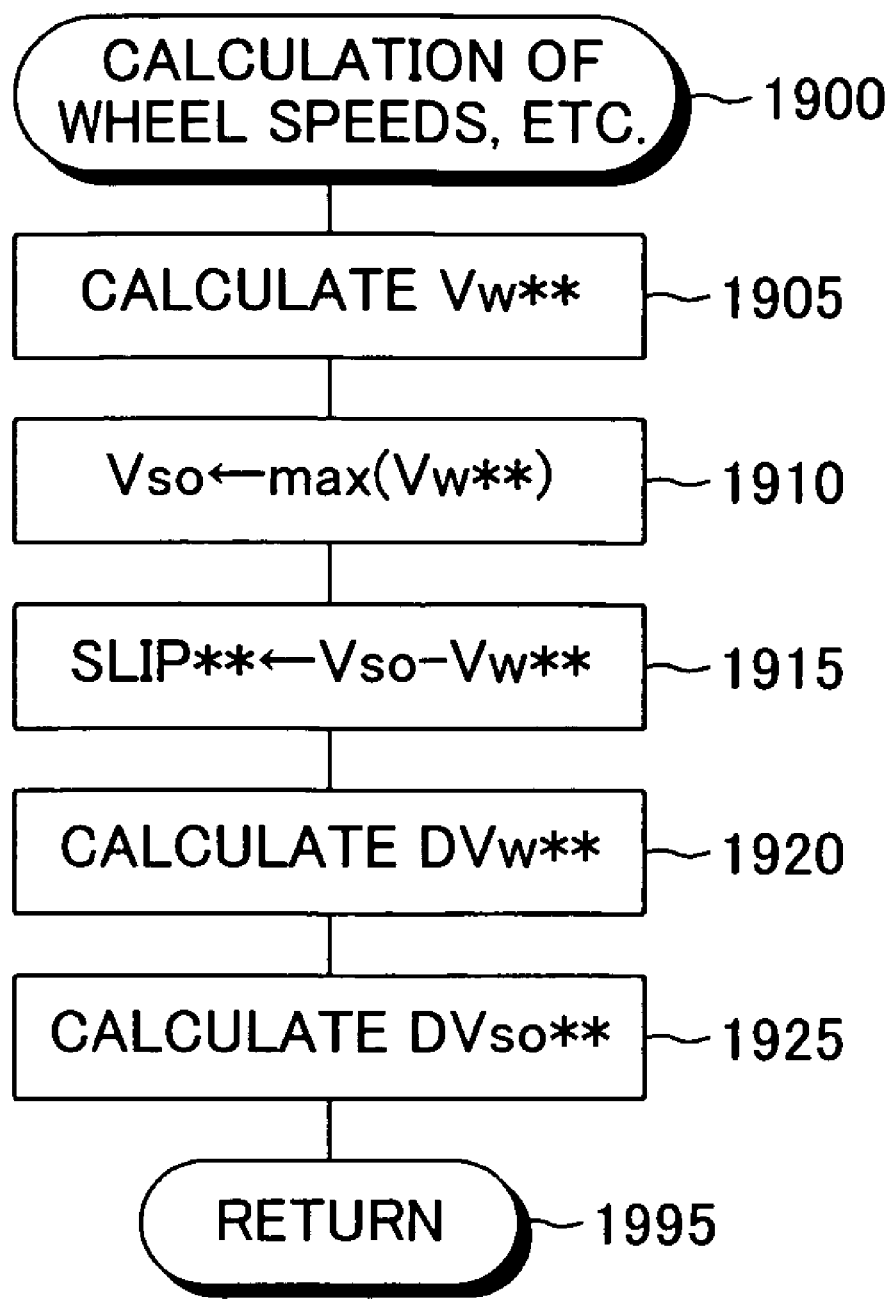
FIG. 19 is a flowchart showing a routine which the CPU shown in FIG. 1 executes in order to calculate wheel speed, etc.

The CPU 51 repeatedly performs a routine shown in FIG. 19 for calculating the wheel speed, etc. at predetermined time intervals. Accordingly, when a predetermined timing is reached, the CPU 51 starts processing of the routine from Step 1900, and proceeds to Step 1905 so as to calculate the wheel speed Vw of the wheel (the speed of the outer periphery of the wheel). Specifically, the CPU 51 calculates the wheel speed Vw on the basis of the time intervals between pulses of a signal which the corresponding wheel speed sensor 41** outputs.

Next, the CPU 51 proceeds to Step 1910 and calculates the highest value among the wheel speeds Vw as the vehicle body speed Vso. Alternatively, the average of the wheel speeds Vw may be calculated as the vehicle body speed Vso. Subsequently, the CPU 51 proceeds to Step 1915 and calculates the slip amount SLIP of the wheel on the basis of the value of the vehicle body speed Vso calculated in Step 1910, the value of the wheel speed Vw** calculated in Step 1905, and the above Eq. 1.

Subsequently, the CPU 51 proceeds to Step 1920 and calculates the wheel acceleration DVw of the wheel, which is a time-differentiated value of the wheel speed Vw, in accordance with the following Eq. 4. In Eq. 4, Vw1 represents the wheel speed Vw** calculated in Step 1905 during the previous execution of the present routine, and $\Delta t$ represents the length of the above-described, predetermined intervals (the execution cycles of the present routine by the CPU 51).

$$DVw^{}=(Vw^{}-Vw1^{**})/\Delta t \qquad (4)$$

Subsequently, the CPU 51 proceeds to Step 1925 and calculates the vehicle body deceleration DVso, which is obtained by inverting the sign of the time-differentiated value of the vehicle body speed Vso, in accordance with the following Eq. 5. Subsequently, the CPU 51 proceeds to Step 1995 so as to end the current execution of the present routine. In Eq. 5, Vso1 represents the vehicle body speed Vso calculated in Step 1910 during the previous execution of the present routine.

$$DVso=-(Vso-Vso1)/\Delta t \qquad (5)$$

Figure 20:
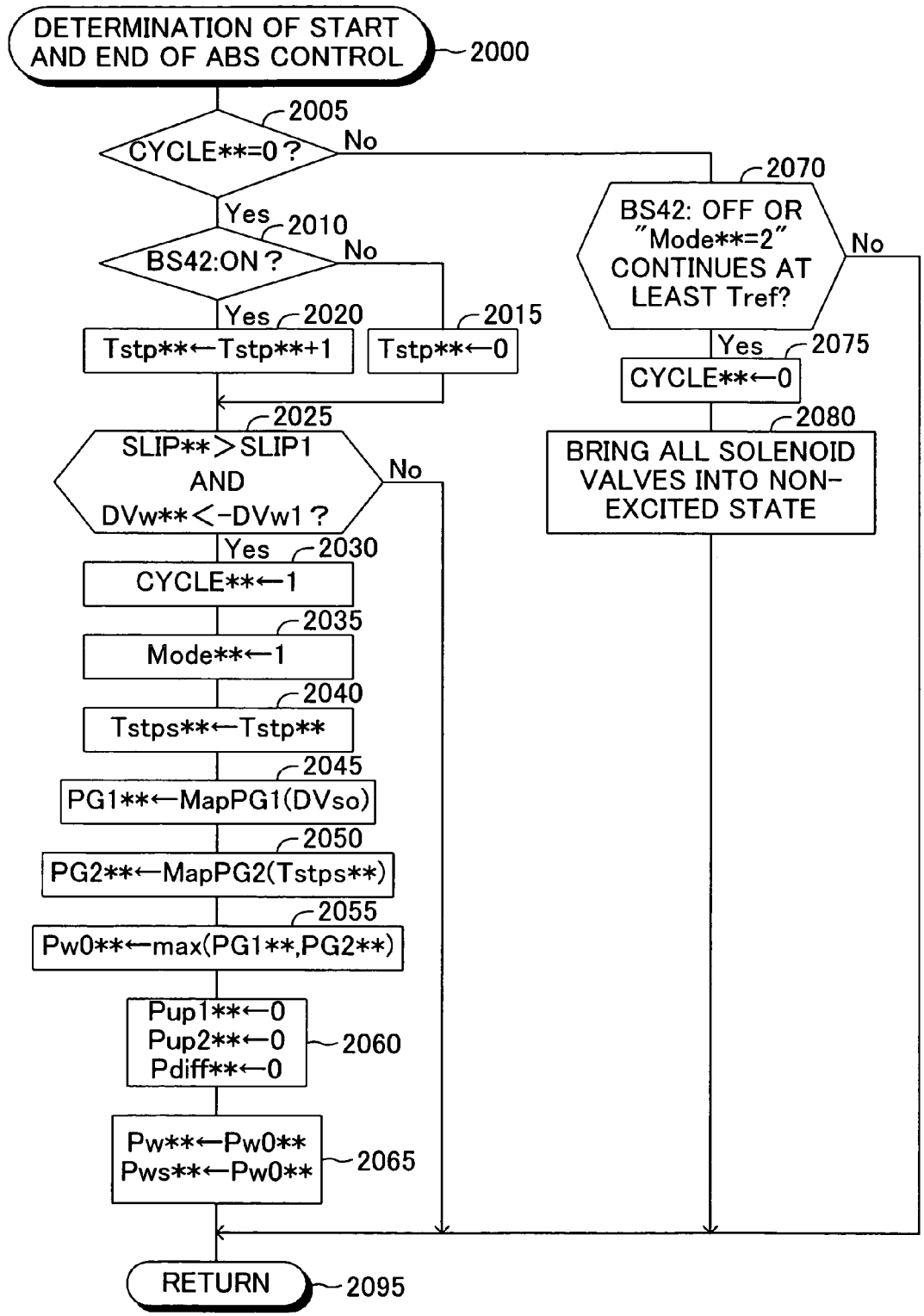
FIG. 20 is a flowchart showing a routine which the CPU shown in FIG. 1 executes in order to perform judgment on start and end of the ABS control.

Further, at predetermined time intervals, the CPU 51 repeatedly performs a routine shown in FIG. 20 for determining the start and end of the ABS control. Accordingly, when a predetermined timing is reached, the CPU 51 starts processing of the routine from Step 2000, and proceeds to Step 2005 so as to determine whether the value of a variable CYCLE is "0." Here, the variable CYCLE represents that the ABS control is not currently executed for the wheel when its value is "0," and that an Nth-time ABS control is currently executed for the wheel when its value is "N" (N: natural number).

The description will be continued on the assumption that the ABS control is currently not performed for the wheel, and ABS control start conditions have not yet been satisfied. In this case, since the value of the variable CYCLE is "0," the CPU 51 makes a "Yes" determination in Step 2005, and then proceeds to Step 2010 in order to determine whether the brake switch 42 outputs an ON signal. When the CPU 51 makes a "No" determination, the CPU 51 proceeds to Step 2015 so as to initialize a counter Tstp** to "0."

On the other hand, when the CPU 51 makes a "YES" determination in Step 2010, the CPU 51 proceeds to Step 2020 so as to increment the counter Tstp by "1." The counter Tstp represents a duration during which a driver operates the brake pedal BP.

Subsequently, the CPU 51 proceeds to Step 2025 in order to determine whether the ABS control start conditions for the wheel have been satisfied. Here, the latest value calculated in the previous Step 1915 is used as SLIP, and the latest value calculated in the previous Step 1920 is used as DVw**.

At the present point in time, the ABS control start conditions are not satisfied for the wheel. Therefore, the CPU 51 makes a "No" determination in Step 2025, and immediately proceeds to Step 2095 in order to end the current execution of the present routine. The above-described processing is repeatedly executed until the ABS control start conditions are satisfied for the wheel.

Next, the description will be continued on the assumption that the driver operates the brake pedal BP in this state, so that the ABS control start conditions are satisfied for the wheel (see time t1 in FIG. 5 and time t11 in FIG. 14). In this case, the CPU 51 makes a "Yes" determination when it proceeds to Step 2025, and then proceeds to Step 2030 in order to change the value of the variable CYCLE from "0" to "1." At the subsequent Step 2035, the CPU 51 sets the value of a variable Mode to "1." Here, the variable Mode represents that the pressure-reducing control is executed for the wheel when its value is "1," and that the linear pressure-increasing control is executed for the wheel when its value is "2."

Subsequently, the CPU 51 proceeds to Step 2040 so as to set the brake operation time before start of ABS control Tstps for the wheel to a value equal to the counter Tstp at the present time, which has been updated in the previous Step 2020. As a result, the brake operation time before start of ABS control Tstps becomes a value corresponding to a time from when brake pedal BP operation is started to when the first-time ABS control for the wheel** is started.

Next, the CPU 51 proceeds to Step 2045 so as to determine the value of PG1 on the basis of the latest value of the vehicle body deceleration DVso calculated in previous Step 1925 (that is, a value at the time of start of the first-time ABS control) and the map shown in FIG. 10. In Step 2050 subsequent thereto, the CPU 51 determines the value of PG2 on the basis of the brake operation time before start of ABS control Tstps set in the previous Step 2040 and the map shown in FIG. 11**.

Subsequently, the CPU 51 proceeds to Step 2055 and sets the estimated initial wheel cylinder pressure value Pw0 for the wheel to the higher value of PG1 and PG2. Thus, the CPU 51 operates as a first obtaining means for obtaining an estimated initial wheel cylinder pressure value (an estimated value representing the wheel cylinder pressure at the start of a first-time antiskid control) as well as a first estimating means for estimating a first value representing the wheel cylinder pressure at a first reducing state of the antiskid control. In the subsequent Step 2060, the CPU 51 initializes the differential pressure addition value Pup1, differential pressure addition value Pup2, and estimated differential pressure value Pdiff for the wheel to "0." In the subsequent Step 2065, the CPU 51 sets the estimated wheel cylinder pressure value Pw and wheel cylinder pressure for control Pws for the wheel to a value equal to the above-described estimated initial wheel cylinder pressure value Pw0. In this way, the CPU 51 operates as a second obtaining means for obtaining an estimated value representing the wheel cylinder pressure, which varies throughout the antiskid control, by making use of at least the estimated initial wheel cylinder pressure value Pw0. In this regard, the CPU 51 also operates as a second estimating means for estimating a second value representing the wheel cylinder pressure at an increasing state of the antiskid control on the basis of the first value. Subsequently, the CPU 51 proceeds to Step 2095** so as to end the current execution of the present routine.

After this point in time, the CPU 51 repeats the following operations: making a "No" determination when it proceeds to Step 2005, and then proceeding to Step 2070 so as to monitor whether the ABS control end conditions have been satisfied for the wheel. The ABS control end conditions are satisfied when the brake switch 42 outputs an OFF signal (i.e., when the driver finishes the operation of the brake pedal BP) or when the state in which "Mode=2" is satisfied (i.e., the execution of the linear pressure-increasing control) continues for at least a predetermined time Tref.

Since the present point in time is immediately after the ABS control start conditions has been satisfied, the CPU 51 makes a "No" determination in Step 2070. After that, until the ABS control end conditions in Step 2070 are satisfied, the CPU 51 repeatedly executes the processing of Steps 2005 and 2070. During the repeated execution of this process, the CPU 51 continuously executes the ABS control for the wheel, which is composed of the pressure-reducing control and linear pressure-increasing control, through execution of the routines shown in FIGS. 21 to 25** which will be described later.

Figure 21:
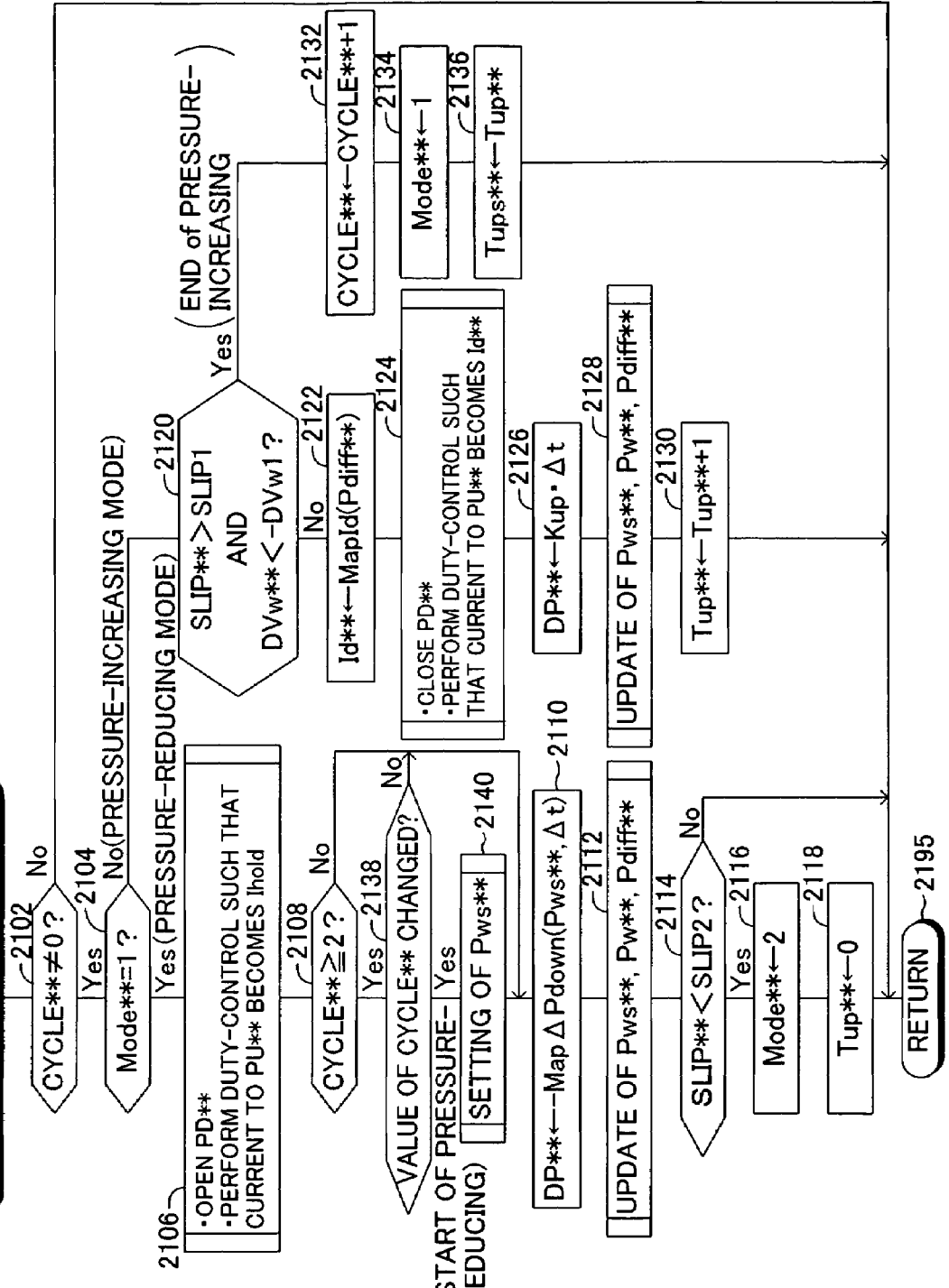
FIG. 21 is a flowchart showing a routine which the CPU shown in FIG. 1 executes in order to perform the ABS control.

The CPU 51 repeatedly performs a routine shown in FIG. 21 for executing the ABS control at predetermined time intervals. Accordingly, when a predetermined timing is reached, the CPU 51 starts processing of the routine from Step 2100, and proceeds to Step 2102 so as to determine whether the value of the variable CYCLE is not "0" (that is, the ABS control for wheel is currently executed). When the CPU 51 makes a "No" determination, the CPU 51 proceeds directly to Step 2195 so as to end the current execution of the present routine.

The description will be continued on the assumption that the present point in time is immediately after the ABS control start conditions for the wheel have been satisfied and immediately after the value of the variable CYCLE has been changed from "0" to "1" by the execution of the previous Step 2030 (see time t1 in FIG. 5 and time t11 in FIG. 14). In this case, the CPU 51 makes a "YES" determination in Step 2102 and proceeds to Step 2104 for determining whether the value of the variable Mode** is "1."

At the present point in time, the value of the variable Mode is "1" because of the processing of the previous Step 2035. Therefore, the CPU 51 makes a "YES" determination in Step 2104, and proceeds to Step 2106 so as to bring the pressure-reducing valve PD for the wheel into its open state, and duty-control the current supplied to the pressure-increasing valve PU to the value Ihold (see FIG. 3). Thus, the pressure-reducing control in the first-time ABS control is started and executed for the wheel**.

Subsequently, the CPU 51 proceeds to Step 2108 so as to determine whether or not the value of the variable CYCLE is at least "2" (that is, whether or not the second-time or subsequent ABS control is currently executed). At the present point in time, since the value of the variable CYCLE is "1," the CPU 51 makes a "No" determination in Step 2108, and proceeds to Step 2110 so as to determine the pressure drop amount DP ($<$0) of the estimated wheel cylinder pressure value Pw (and the wheel cylinder pressure for control Pws) during the execution cycle $\Delta$t in the pressure-reducing control, on the basis of the wheel cylinder pressure for control Pws (at the present point in time, equal to the estimated initial wheel cylinder pressure value Pw0 as a result of the processing in the previous Step 2065), the execution cycle $\Delta$t of the present routine of the CPU 51, and the map shown in FIG. 13**.

Subsequently, the CPU 51 proceeds via Step 2112 to the routine of FIG. 22 which is adapted to update Pws, Pw, and Pdiff, and starts the processing thereof from Step 2200. That is, when the CPU 51 proceeds from Step 2200 to Step 2205, the CPU 51 updates the wheel cylinder pressure for control Pws to a value determined by adding to the value at that time (at the present point in time, equal to the estimated initial wheel cylinder pressure value Pw0) the pressure drop amount DP obtained in the previous Step 2110. In the subsequent Step 2210, the CPU 51 updates the estimated wheel cylinder pressure value Pw to a value determined by adding the pressure drop amount DP to the value at that time (at the present point in time, equal to the estimated initial wheel cylinder pressure value Pw0).

Figure 23:
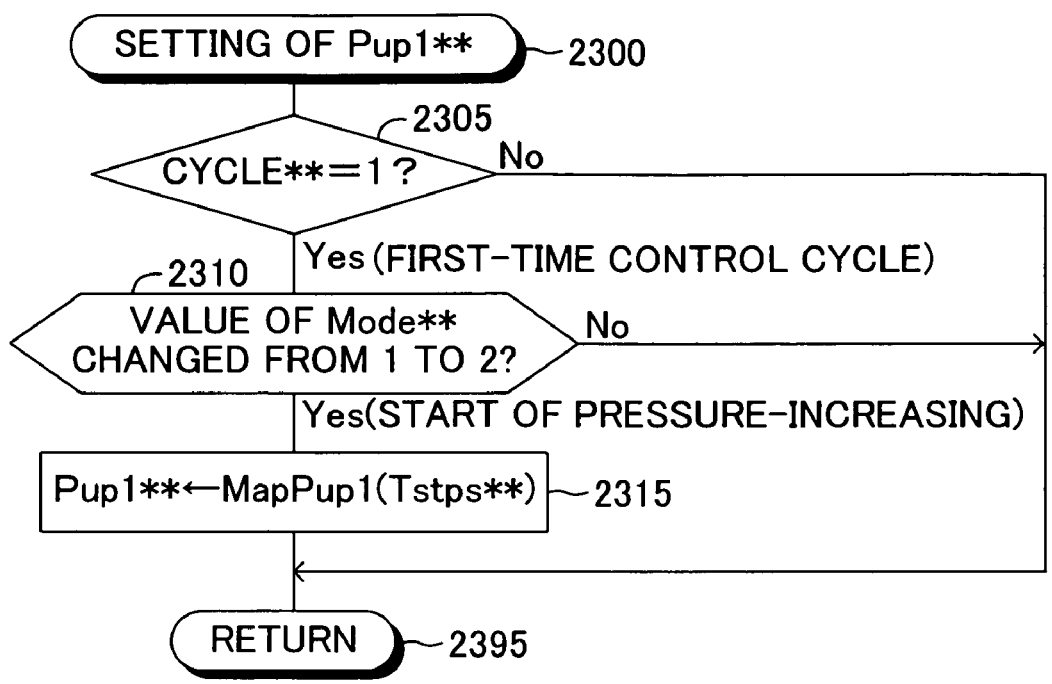
FIG. 23 is a flowchart showing a routine which the CPU shown in FIG. 1 executes in order to set the differential pressure addition value.

Subsequently, the CPU 51 proceeds via Step 2215 to the routine of FIG. 23 adapted to set the differential pressure addition value Pup1, and starts the processing of the routine from Step 2300. That is, when the CPU 51 proceeds from Step 2300 to Step 2305, the CPU 51 determines whether the value of the variable CYCLE is "1" or not. When the CPU 51 makes a "No" determination (the second-time or subsequent ABS control is currently executed), the CPU 51 proceeds directly to Step 2395**.

Since at the present point in time, the first-time ABS control is executed and the value of the variable CYCLE is "1," the CPU 51 makes a "Yes" determination in Step 2305, and proceeds to Step 2310 so as to determine whether the value of the variable Mode has been changed from "1" to "2" (that is, whether the control mode has changed from the pressure-reducing control to the linear pressure-increasing control).

The present point in time is immediately after the pressure-reducing control has been started and the value of the variable Mode is maintained at "1." Therefore, the CPU 51 makes a "No" determination in Step 2310 and proceeds to Step 2395. As a result, the differential pressure addition value Pup1 is maintained at the initial value "0" set in the previous Step 2060 without change. The CPU 51 returns, via Step 2395, to Step 2220 shown in FIG. 22. Subsequently, the CPU 51 proceeds from Step 2220 to the routine of FIG. 24 adapted to set the differential pressure addition value Pup2, and starts the processing of the routine from Step 2400.

That is, when the CPU 51 proceeds Step from 2400 to Step 2405, the CPU 51 determines whether or not the value of the variable CYCLE is at least "2." When the CPU 51 makes a "Yes" determination, the CPU 51 executes the processing of Step 2410 and subsequent steps. At the present point in time, since the value of the variable CYCLE is "1," the CPU 51 makes a "No" determination in Step 2405 and proceeds directly to Step 2495. As a result, the differential pressure addition value Pup2** is also maintained at the initial value "0" set in the previous Step 2060 without change.

Figure 22:
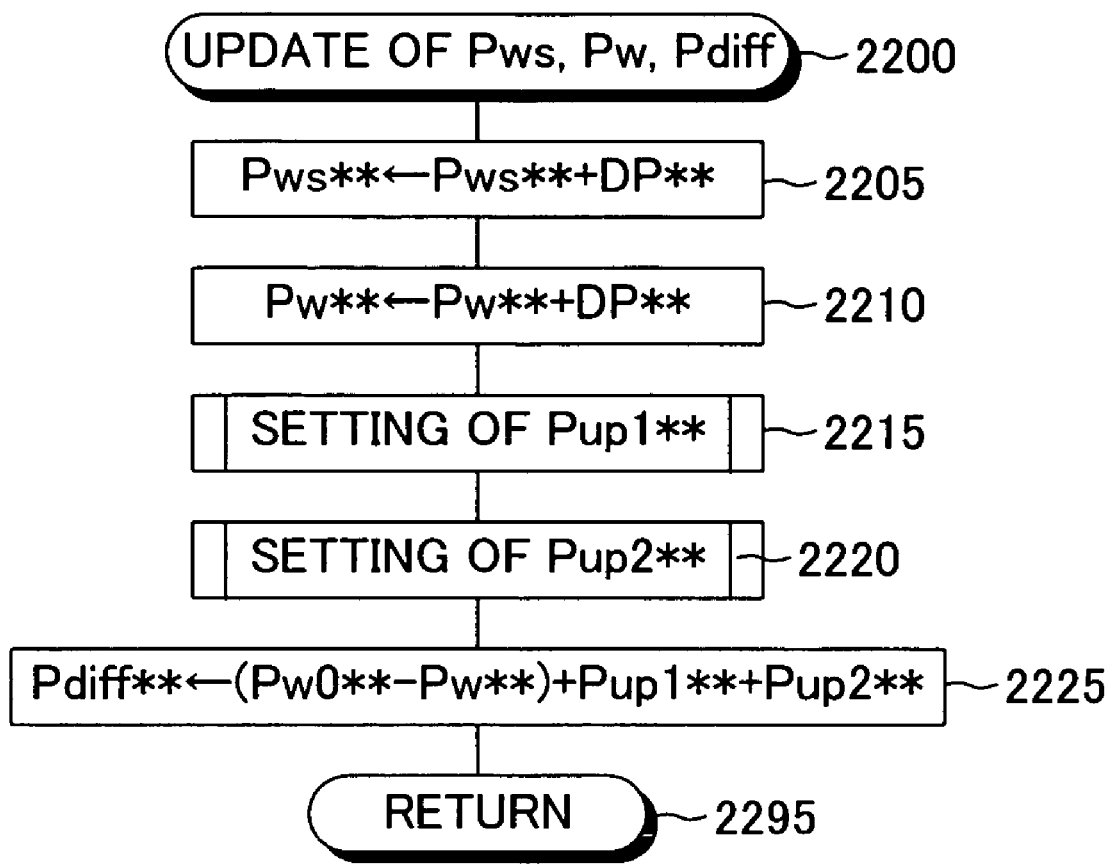
FIG. 22 is a flowchart showing a routine which the CPU shown in FIG. 1 executes in order to update wheel cylinder pressure for control, the estimated wheel cylinder pressure value, and the estimated differential pressure value.

The CPU 51 returns, via Step 2495, to Step 2225 shown in FIG. 22 so as to update (determine) updates (determines) the estimated differential pressure value Pdiff for the wheel on the basis of Pw0, Pw, Pup1, and Pup2 at the present point in time and the above Eq. 2, and then proceeds to Step 2295. The CPU thus operates as a third obtaining means for obtaining an estimated value representing the differential pressure between the master cylinder pressure and the wheel cylinder pressure on the basis of the difference between the estimated initial wheel cylinder pressure value and the estimated wheel cylinder pressure value. The CPU 51 also operates as a third estimating means for estimating a third value representing a differential pressure between the master cylinder pressure and the wheel cylinder pressure on the basis of a difference between the first value and the second value. As a result, the wheel cylinder pressure for control Pws, the estimated wheel cylinder pressure value Pw, and the estimated differential pressure value Pdiff are updated. Notably, in the first-time ABS control, the wheel cylinder pressure for control Pws and the estimated wheel cylinder pressure value Pw** always become same value.

The CPU 51 then returns, via Step 2295, to Step 2114 shown in FIG. 21, and determines whether the above-described pressure-increasing control start conditions have been satisfied. Since the present point in time is immediately after the pressure-reducing control has been started, the value of SLIP** is greater than the value of SLIP2. The CPU 51 makes a "No" determination in Step 2114, and proceeds directly to Step 2195.

The above-described processing is repeatedly executed until the pressure-increasing control start conditions are satisfied for the wheel. As a result, the pressure-reducing control in the first-time ABS control is continued for the wheel, whereby the wheel cylinder pressure for control Pws and the estimated wheel cylinder pressure value Pw decrease while taking the same value, and the estimated differential pressure value Pdiff** increases (see times t1 to t1' in FIG. 5 and times t11 to t12 in FIG. 14).

When a predetermined period of time elapses and the above-described pressure-increasing control start conditions are satisfied for the wheel (see time t1' in FIG. 5 and time t12 in FIG. 14), the CPU 51 makes a "YES" determination when it proceeds to Step 2114 of FIG. 21, and proceeds to Step 2116 so as to change the value of the variable Mode from "1" to "2." At the subsequent Step 2118, the CPU 51 initializes the value of the counter Tup to "0." This counter Tup represents the duration of the linear pressure-increasing control for the wheel**.

After that, since the value of the variable Mode** is "2," the CPU 51 makes a "No" determination in Step 2104, and proceeds to Step 2120. When the CPU 51 proceeds to Step 2120, the CPU 51 determines whether the same ABS control start conditions as those of the previous Step 2025 have been again satisfied (that is, whether the second-time control cycle has been started).

Since the present point in time is immediately after the linear pressure-increasing control in the first-time ABS control has been started, the ABS control start conditions are not satisfied. Accordingly, the CPU 51 makes a "No" determination in Step 2120, and proceeds to Step 2122 so as to determine the instruction current Id supplied to the pressure-increasing valve PU for the wheel** on the basis of the estimated differential pressure value Pdiff at that time (at the present point in time, the time of start of the linear pressure-increasing control, see time t1' in FIG. 5 and time t12 in FIG. 14) and the map shown in FIG. 3.

Subsequently, the CPU 51 proceeds to Step 2124 so as to bring the pressure-reducing valve PD for the wheel into its closed state, and duty-control the current supplied to the pressure-increasing valve PU to the above-determined instruction current Id. Thus, the linier pressure-increasing control in the first-time ABS control for the wheel** is started and executed.

Subsequently, the CPU 51 proceeds to Step 2126 so as to determine the pressure rise amount DP (>0) of the estimated wheel cylinder pressure value Pw (and the wheel cylinder pressure for control Pws**) during the execution cycle $\Delta t$ in the linear pressure-increasing control. Here, Kup is a value (positive value) corresponding to a rising gradient of the wheel cylinder pressure during the linear pressure-increasing control.

Subsequently, the CPU 51 starts, via Step 2128, the processing of the above-described routine of FIG. 22. After the CPU 51 executes the processing of Step 2205 and Step 2210, the CPU 51 starts, via Step 2215, processing of the routine of FIG. 23. Since the present point in time is immediately after the linear pressure-increasing control in the first-time ABS control has been started, the value of the variable CYCLE is "1," and the value of the variable Mode has been just changed from "1" to "2."

Accordingly, the CPU 51 makes a "Yes" determination in Step 2305 and Step 2310, and proceeds to Step 2315 so as to change the differential pressure addition value Pup1 from "0" to a value obtained on the basis of the brake operation time before start of ABS control Tstps** set in the previous step 2040 and the map shown in FIG. 15. Notably, after that, since the CPU 51 makes a "No" determination in Step 2310, the differential pressure addition value Pup1 is maintained at this value until the ABS control end conditions (the conditions of Step 2070 of FIG. 20) are satisfied.

The CPU 51 executes, via Step 2395, the processing of Step 2220 of FIG. 22 (that is, the routine of FIG. 24) and Step 2225. After that, the CPU 51 returns, via Step 2295, to Step 2130 of FIG. 21 so as to increment the value of the counter Tup** by "1," and proceeds to 2195. The above-described processing is repeatedly executed until the ABS control start conditions are again satisfied.

Thus, the linear pressure-increasing control in the first-time ABS control for the wheel is continued, whereby the wheel cylinder pressure for control Pws and the estimated wheel cylinder pressure value Pw increases while taking the same value, and the estimated differential pressure value Pdiff decreases (see times t1' to t2 in FIG. 5). In addition, after the time of start of the linear pressure-increasing control in the first-time ABS control, the estimated differential pressure value Pdiff calculated and updated in Step 2225 of FIG. 22 is calculated to be rather larger by the differential pressure addition value Pup1 calculated in Step 2315 (see after time t12 in FIG. 14).

When a predetermined period of time elapses and the above-described ABS control start conditions are again satisfied (see time t2 in FIG. 5), the CPU 51 makes a "YES" determination when it proceeds to Step 2120 of FIG. 21, and proceeds to Step 2132 so as to increment the value of the variable CYCLE by "1." In the subsequent Step 2134, the CPU 51 changes the value of the variable Mode from "2" to "1." In the subsequent Step 2136, the CPU 51 sets linear pressure-increasing control duration Tups for the wheel to a value equal to the counter Tup at the present point in time, which has been updated in the previous Step 2130. As a result, the linear pressure-increasing control duration Tups becomes a value corresponding to the duration of the linear pressure-increasing control which has been executed so far. Thus, the first-time ABS control is ended and the second-time ABS control is started.

That is, the value of the variable CYCLE has changed to "2," and the value of the variable Mode has changed to "1." Accordingly, the CPU 51 makes "Yes" determination in Step 2102 and Step 2104. After the CPU 51 executes the processing of Step 2106 (after the pressure-reducing control in the second-time ABS control is started), the CPU 51 makes "Yes" determination in Step 2108, and proceeds to 2138 so as to determine whether the value of the variable CYCLE** has been changed (that is, whether the present point in time is immediately after the ABS control start conditions has been satisfied (the pressure-reducing control has been started)).

Figure 25:
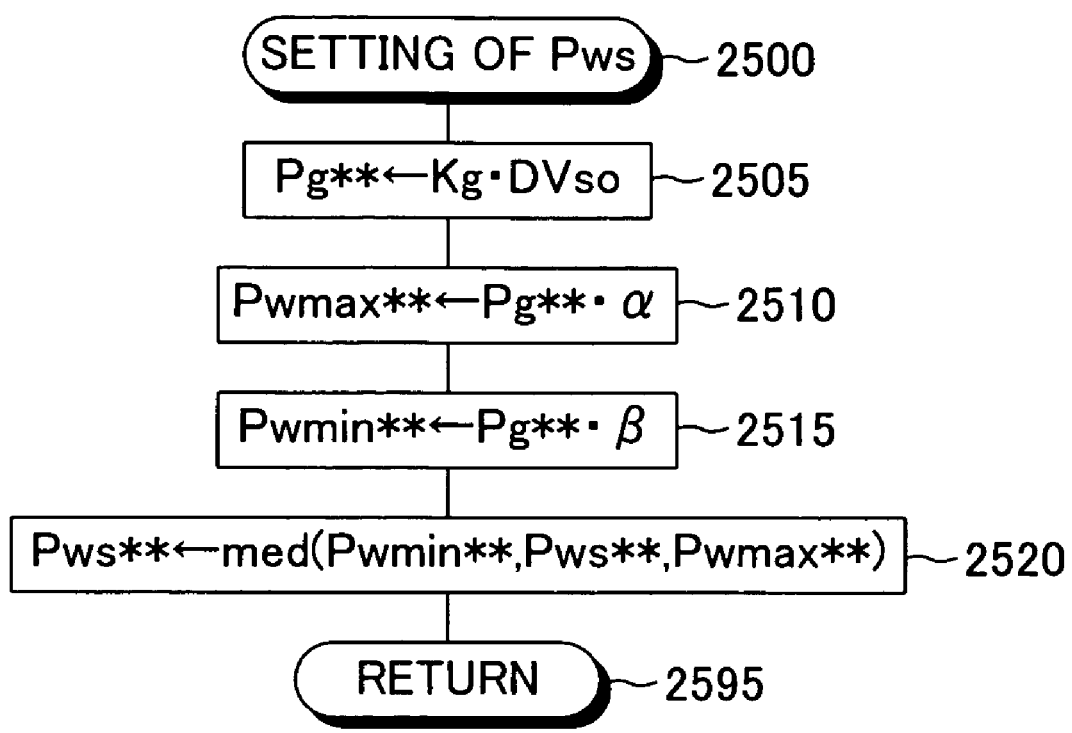
FIG. 25 is a flowchart showing a routine which the CPU shown in FIG. 1 executes in order to set the wheel cylinder pressure for control.

Since the present point in time is immediately after the value of the variable CYCLE** has changed from "1" to "2," the CPU 51 makes "Yes" determination in Step 2138, and proceeds via Step 2140 to the routine of FIG. 25 adapted to set the wheel cylinder pressure for control Pws so as to start the processing of the routine from Step 2500. Thus, the processing of the routine shown in FIG. 25 is executed each time the second-time or subsequent ABS control is started.

That is, when the CPU 51 proceeds from Step 2500 to Step 2505, the CPU 51 determines the lock pressure Pg on the basis of the latest value of the vehicle body deceleration DVso updated in the previous Step 1925 (that is, a value at time of the start of the pressure-reducing control) and the above Eq. 3. In the subsequent Step 2510, the CPU 51 obtains the upper limit Pwmax by multiplying the lock pressure Pg by α (1<α). In the subsequent Step 2515, the CPU 51 obtains the lower limit Pwmin by multiplying the lock pressure Pg** by β (0<β<1).

The CPU 51 proceeds to Step 2520 so as to set the wheel cylinder pressure for control Pws for the wheel to a middle value among the above-described lower limit Pwmin, the wheel cylinder pressure for control Pws at that time updated in Step 2205 (that is, at the time of start of the second-time or subsequent ABS control), and the above-described upper limit Pwmax**. After that the CPU 51 executes the processing of Step 2110 and subsequent steps of FIG. 21 via Step 2595.

As a result, if the wheel cylinder pressure for control Pws at the time of start of the second-time or subsequent ABS control is between the upper limit Pwmax and the lower limit Pwmin, the wheel cylinder pressure for control Pws is maintained at the value at that time.

Meanwhile, if the wheel cylinder pressure for control Pws at the time of start of the second-time or subsequent ABS control exceeds the upper limit Pwmax, it is set to the upper limit Pwmax; if the wheel cylinder pressure for control Pws at the time of start of the second-time or subsequent ABS control falls below the lower limit Pwmin, it is set to the lower limit Pwmin.

That is, in this case, the wheel cylinder pressure for control Pws which was described with reference to FIG. 17 and FIG. 18 is set. Accordingly, in this case, the pressure drop amount DP (<0) of the estimated wheel cylinder pressure value Pw** during the pressure-reducing control in the second-time or subsequent ABS control is calculated to be rather smaller or larger in Step 2110 of FIG. 21 (See the solid line of FIG. 17 and FIG. 18).

Figure 24:
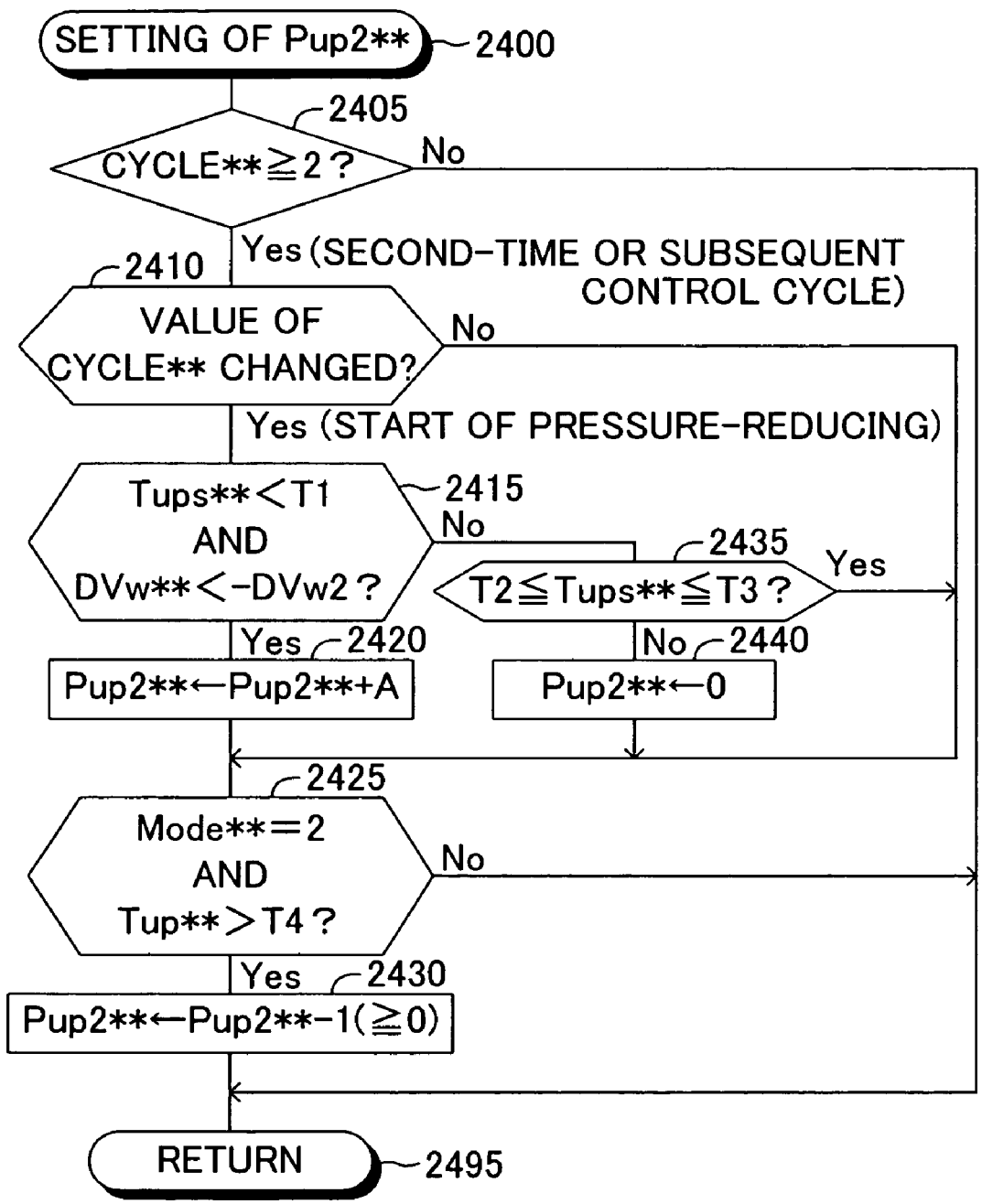
FIG. 24 is a flowchart showing a routine which the CPU shown in FIG. 1 executes in order to set the differential pressure addition value.

In addition, during the execution of the second-time or subsequent ABS control (that is, in a case where the value of the variable CYCLE is "2" or greater), when the CPU 51 executes the routine of FIG. 24 via Step 2220 of the routine of FIG. 22 executed via Step 2112 of FIG. 21, the CPU 51 makes "Yes" determination in Step 2405. That is, the CPU 51 makes a "Yes" determination when it proceeds to Step 2405, and then proceeds to Step 2410 so as to determine whether the value of the variable CYCLE has been changed.

The description will be continued on the assumption that the present point in time is immediately after the value of the variable CYCLE has been changed (the second-time or subsequent ABS control has been started), the CPU 51 makes "Yes" determination in Step 2410, and proceeds to Step 2415 so as to determine whether the following two conditions have been satisfied simultaneously; (1) the previous linear pressure-increasing control duration Tups set in the previous Step 2136 is less than a predetermined period of time T1 and (2) the wheel acceleration DVw** calculated in Step 1920 is less than a predetermined value −DVw2 (that is, the above-described hunting phenomenon has occurred).

Here, it is assumed that the CPU 51 makes "Yes" determination in Step 2415. In this case, the CPU 51 proceeds to Step 2420 so as to update the differential pressure addition value Pup2 to a value obtained by adding the value A (fixed value) to the differential pressure addition value Pup2 at that time (the initial value is "0" set in the previous Step 2060) (for example, see time t15 in FIG. 14).

Subsequently, the CPU 51 proceeds to Step 2425 so as to determine whether the following two conditions have been satisfied simultaneously; (1) the value of the variable Mode is "2" and (2) the value of the counter Tup updated in Step 2130 is greater than a predetermined value T4 (that is, whether the linear pressure-increasing control is currently executed, and the elapsed time from the time of start of the linear pressure-increasing control has reached the predetermined value T4). Since the pressure-reducing control in the second-time or subsequent ABS control is executed at the present point in time, the CPU 51 makes "No" determination" in Step 2425 and proceeds to Step 2495.

Notably, after this point in time, the CPU 51 repeats the following operations: making a "No" determination when it proceeds to Step 2410, proceeding directly to Step 2425, and making a "No" determination in Step 2425 as well. The above-described processing of the routine of FIG. 24 is repeatedly executed, until the conditions of Step 2425 are satisfied.

It is assumed that the pressure-reducing control in the second-time or subsequent ABS control has ended, and a time corresponding to the predetermined value T4 has elapsed after the start of the linear pressure-increasing control executed thereafter (for example, time t16 in FIG. 14). In this case, the value of the variable Mode has become "2" due to the processing of Step 2116, and the value of the counter Tup updated in Step 2130 has become larger than the predetermined value T4.

Accordingly, when the CPU 51 executes the routine of FIG. 24 via Step 2220 of the routine of FIG. 22 executed via Step 2128 of FIG. 21, the CPU 51 makes a "Yes" determination in Step 2425, and proceeds to Step 2430 so as to decrease the differential pressure addition value Pup2 by "1" from the value at that time (within a range equal to "0" or greater). The above-described processing is repeatedly executed until the value of the variable CYCLE is changed (that is, the next ABS control is started) and a "Yes" determination is made in Step 2410 (for example, times t16 to t17 in FIG. 14**).

When the next ABS control is started, the CPU 51 makes "Yes" determination in Step 2410 of FIG. 24 again, and proceeds to Step 2415 so as to make a determination. Here, if the CPU 51 makes a "Yes" determination, it proceeds to Step 2420 so as to again update the differential pressure addition value Pup2 to a value obtained by adding the value A to the differential pressure addition value Pup2 at that time (for example, see times t17 to t18 in FIG. 14).

Meanwhile, when a "No" determination is made in Step 2415 (that is, when it is determined that the hunting phenomenon has stopped), the CPU 51 proceeds to Step 2435 so as to determine whether the previous linear pressure-increasing control duration Tups is within a proper range (T2≦Tups≦T3, where T2 and T3 are constants). When the CPU 51 makes a "Yes" determination, the CPU 51 proceeds directly to Step 2425. Here, since the value of the variable Mode is "1," the CPU 51 makes a "No" determination in Step 2425 and proceeds to Step 2495. Thus, after that, the differential pressure addition value Pup2 is maintained at the value which is obtained when a "No" determination has been made in Step 2415 (see after time t19 in FIG. 14).

Meanwhile, when a "No" determination is made in Step 2435, an anomaly has occurred in relation to the previous linear pressure-increasing control duration Tups. That is, the above-described "delays in start of pressure-increasing of the wheel cylinder pressure" or "sudden rise in the wheel cylinder pressure" may have occurred, and the estimated differential pressure value Pdiff may deviate from the actual differential pressure. In this case, the CPU 51 proceeds to Step 2440 so as to clear the differential pressure addition value Pup2**, which is low in reliability, to "0."

In this manner, after the time of start of the second-time ABS control, the estimated differential pressure value Pdiff which is calculated and updated in Step 2225 of FIG. 22 is calculated to be rather larger by the differential pressure addition value Pup2 which can be repeatedly changed by the processing of the routine of FIG. 24.

The above-described operation of the CPU 51 can be executed so long as the ABS control end conditions of Step 2070 are not satisfied in the routine of FIG. 20 in which the processing of Steps 2005 and 2070 is repeatedly executed. Accordingly, in a case where the condition of Step 2070 is satisfied (e.g.; the driver stops the operation of the brake pedal BP) during the above-mentioned operation, the CPU 51 makes a "YES" determination in Step 2070 and proceeds to Step 2075 so as to change the value of the variable CYCLE from a value other than "0" to "0." In the subsequent Step 2080, all the solenoid valves (specifically, the pressure-increasing valve PU and the pressure-reducing valve PD**) are brought into their non-excited states. This ends the executed series of ABS control.

After this point in time, the CPU 51 repeats the following operations: making a "No" determination when it proceeds to Step 2102 of FIG. 21, and proceeding directly to Step 2195. As a result, the ABS control is not executed. Further, the CPU 51 makes a "YES" determination when it proceeds to Step 2005 of FIG. 20, and again proceeds to Step 2025 so as to again monitor whether the ABS control start conditions are satisfied.

As described above, the antiskid control apparatus for a vehicle according to the embodiment of the present invention employs, as the pressure-increasing valve PU, a normally-open linear solenoid valve whose supply current is linearly controlled by means of duty control, and employs a normally-closed on-off solenoid valve as the pressure-reducing valve PD. Then, the present apparatus repeatedly executes the ABS control which is composed of the pressure-reducing control and the linear pressure-increasing control, after the ABS control start conditions are satisfied and until the ABS control end conditions are satisfied.

When the ABS control start conditions are satisfied, the present apparatus determines the initial value Pw0 of the estimated wheel cylinder pressure value Pw on the basis of the vehicle body deceleration DVso (that is, the lock pressure Pg) at the time when the ABS control start conditions are satisfied and the brake operation time before start of ABS control Tstp, and then obtains the estimated wheel cylinder pressure value Pw during the ABS control on the basis of the estimated initial wheel cylinder pressure value Pw0 and the pressure-reducing characteristic of the pressure-reducing valve PD.

During the ABS control, the present apparatus obtains the estimated value Pdiff of the differential pressure between the master cylinder pressure Pm and the wheel cylinder pressure in accordance with the above Eq. 2 (Pdiff=(Pw0−Pw)+Pup1+Pup2). Further, the present apparatus determines the instruction current Id supplied to the pressure-increasing valve PU during the linear pressure-increasing control by use of the obtained estimated differential pressure value Pdiff. The differential pressure addition value Pup1 is set according to the brake operation time before start of ABS control Tstp, and the differential pressure addition value Pup2 is set according to the additional operation of the brake pedal BP during the ABS control.

By virtue of the above operation, the present apparatus can precisely estimate and obtain the estimated differential pressure value Pdiff from the first-time ABS control, regardless of whether the brake operation triggering the start of the ABS control is performed rapidly or not, and independently of the road-surface frictional coefficient μ. Moreover, even if the additional operation of the brake pedal BP occurs during the ABS control, the present apparatus can precisely estimate and obtain the estimated differential pressure value Pdiff to be increased because of the additional brake operation.

The present invention is not limited to the above-described embodiment, and various modifications may be practiced without departing from the scope of the present invention. For example, in the above-described embodiment, the antiskid control apparatus is configured to execute repeatedly ABS control composed of pressure-reducing control and linear pressure-increasing control. However, it may be configured to perform repeatedly ABS control which is composed of pressure-reducing control, pressure-holding control, and linear pressure-increasing control.

In the above-described embodiment, the antiskid control apparatus is configured to always change the differential pressure addition value Pup1 from "0" to a value obtained on the basis of the map shown in FIG. 15, after the time of start of the linear pressure-increasing control in the first-time ABS control (see Steps 2310 and 2315). However, it may be configured to change the differential pressure addition value Pup1 from "0" to a value obtained on the basis of the map shown in FIG. 15, only in the case where PG1>PG2 is satisfied.

In the above-described embodiment, the maximum value of PG1 is the same as that of PG2 (see FIG. 10 and FIG. 11). However, the maximum values of PG1 and PG2 may differ from each other.

In the above-described embodiment, during the pressure-reducing control, the drop in the estimated wheel cylinder pressure value Pw is obtained by use of the map shown in FIG. 13 for every execution cycle Δt of the program. However, the total drop amount (total pressure drop amount) of the estimated wheel cylinder pressure value Pw throughout the duration of the pressure-reducing control may be obtained at a time by use of the map shown in FIG. 13.

In the above-described embodiment, in accordance with the above Eq. 2, the differential pressure addition values Pup1 and Pup2 are added to the estimated differential pressure value Pdiff independently of the estimated initial wheel cylinder pressure value Pw0. However, the differential pressure addition values Pup1 and Pup2 may be added to the estimated differential pressure value Pdiff by means of correcting the estimated initial wheel cylinder pressure value Pw0 itself so as to increase by the differential pressure addition values Pup1 and Pup2.

In the above-described embodiment, when the estimated wheel cylinder pressure value Pw at the time of start of the ABS control falls below the lower limit Pwmin, the antiskid control apparatus calculates the estimated differential pressure value Pdiff to be rather larger by means of calculating the drop in the estimated wheel cylinder pressure value Pw during the pressure-reducing control to be rather larger on the basis of the hypothetical wheel cylinder pressure for control Pws, which decreases from the lower limit Pwmin during the pressure-reducing control, and the map shown in FIG. 13. However, it may be configured to calculate the estimated differential pressure value Pdiff to be rather larger by means of correcting the estimated initial wheel cylinder pressure value Pw0 such that the estimated initial wheel cylinder pressure value Pw0 becomes larger by an amount corresponding to the shortage of the estimated wheel cylinder pressure value Pw at the time of start of the ABS control with respect to the lower limit Pwmin.

In the above-described embodiment, when the estimated wheel cylinder pressure value Pw at the time of start of the ABS control exceeds the upper limit Pwmax, the antiskid control apparatus calculates the estimated differential pressure value Pdiff to be rather smaller by means of calculating the drop in the estimated wheel cylinder pressure value Pw during the pressure-reducing control to be rather smaller on the basis of the hypothetical wheel cylinder pressure for control Pws, which decreases from the upper limit Pwmax during the pressure-reducing control, and the map shown in FIG. 13. However, it may be configured to calculate the estimated differential pressure value Pdiff to be rather smaller by means of correcting the estimated initial wheel cylinder pressure value Pw0 such that the estimated initial wheel cylinder pressure value Pw0 becomes smaller by an amount corresponding to the excess of the estimated wheel cylinder pressure value Pw at the time of start of the ABS control with respect to the upper limit Pwmax.

In the above-described embodiment, the antiskid control apparatus is configured to obtain the upper limit Pwmax and the lower limit Pwmin by multiplying the lock pressure Pg by a predetermined value α (1<α) and a predetermined value β (0<β<1). However, it may be configured to obtain the upper limit Pwmax and the lower limit Pwmin by adding to the lock pressure Pg, a predetermined value α' (α'>0) and a predetermined value β' (β'<0).

In the above-described embodiment, the antiskid control apparatus is configured to add the value A to the differential pressure addition value Pup2 at the time of start of the ABS control (that is, at the time of start of the pressure-reducing control). However, it may be configured to add the value A to the differential pressure addition value Pup2 at the time of start of the linear pressure-increasing control.

Figure 26:
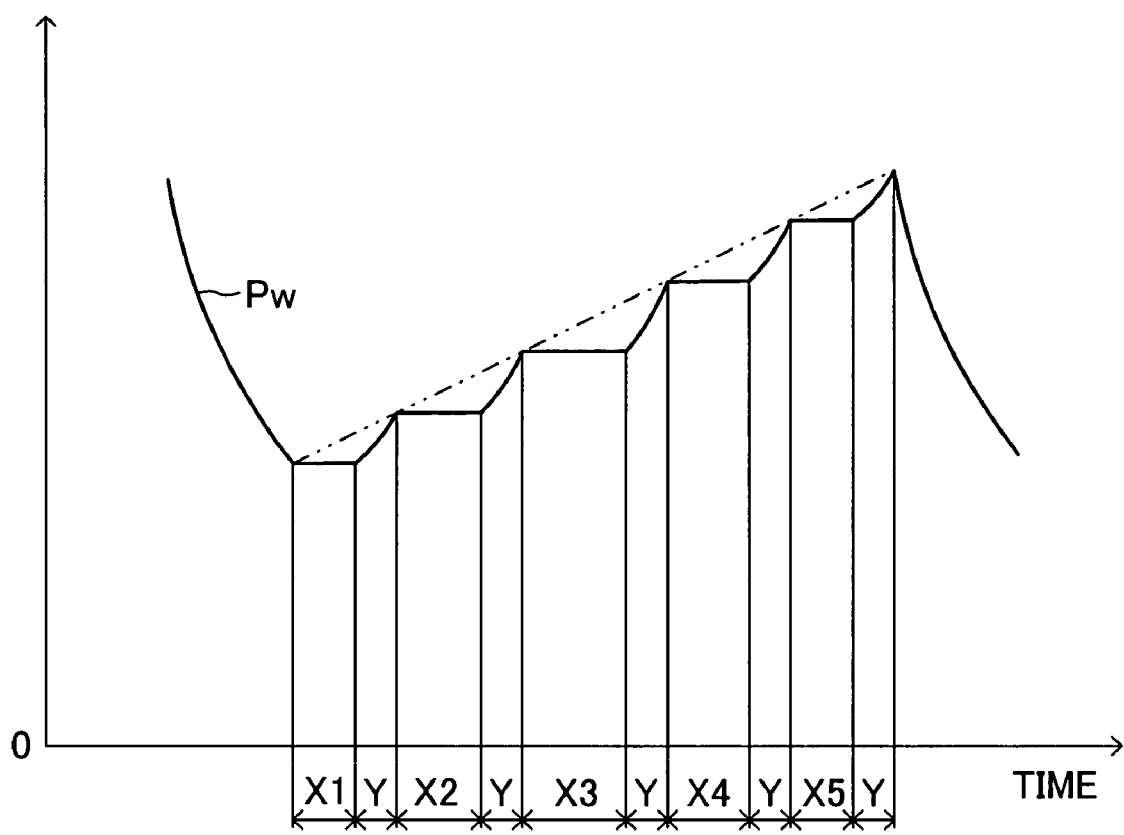
FIG. 26 is a graph showing an example open-close pattern of the pressure-increasing valve in a case where an on-off solenoid valve is used as the pressure-increasing valve so as to perform open-close pressure-increasing control.

In addition, in the above-described embodiment, the antiskid control apparatus is configured to use the (normally-open) linear solenoid valve PU as a pressure-increasing valve. However, a (normally-open) on-off solenoid valve PU may be used as a pressure-increasing valve. In this case, as shown in FIG. 26, open-close pressure-increasing control which opens and closes the pressure-increasing valve alternately (that is, pressure-increasing periods and pressure-holding periods are repeated alternately) is performed instead of the linear pressure-increasing control. In the open-close pressure-increasing control, the pattern in which the pressure-increasing valve is opened and closed is determined on the basis of the estimated differential pressure value Pdiff.

Figure 27:
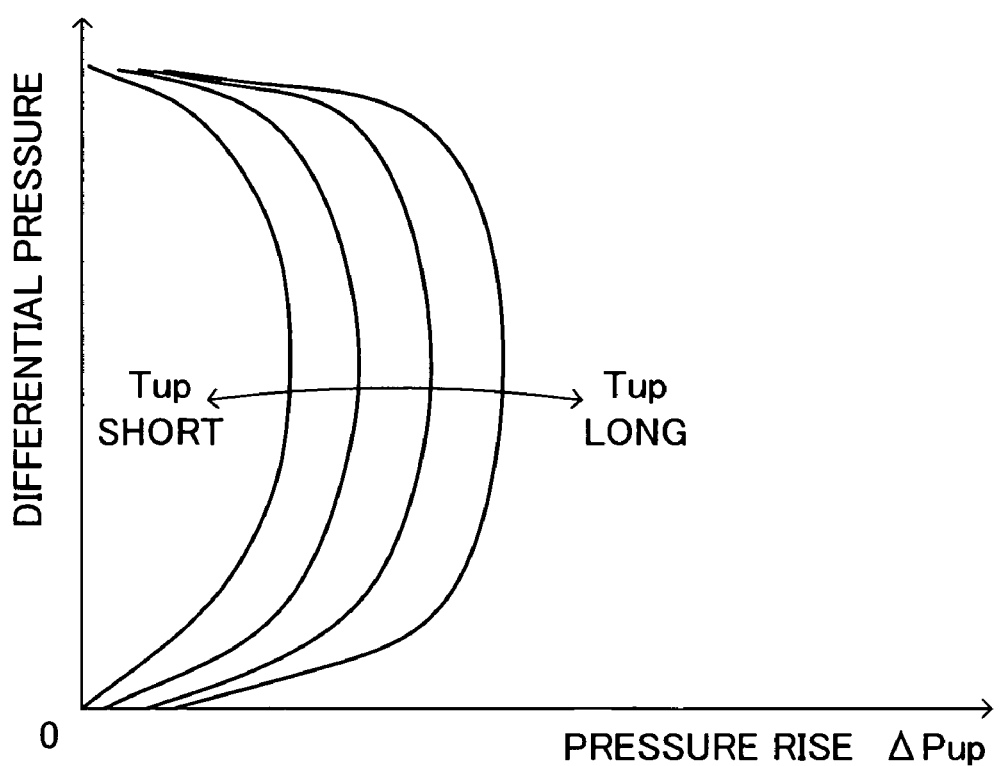
FIG. 27 is a graph showing a relationship among valve-opened-state maintaining time, differential pressure between the master cylinder pressure and the wheel cylinder pressure, and wheel cylinder pressure rise amount for a case where the pressure-increasing valve, which is an on-off solenoid valve, is maintained in its open state.

That is, as shown in FIG. 27, when the pressure-increasing valve, which is an on-off solenoid valve, opens during the open-close pressure-increasing control, the pressure rise amount ΔPup of the wheel cylinder pressure is determined dependent on the differential pressure between the master cylinder pressure and wheel cylinder pressure, and the time Tup over which the pressure-increasing valve is maintained in its open state. Such a pressure-increasing characteristic provided by the pressure-increasing valve can be previously obtained through a predetermined experiment, simulation, or the like.

Accordingly, for example, when each pressure-increasing period during the open-close pressure-increasing control is represented by time Y (fixed), the pressure rise amount of the wheel cylinder pressure during each pressure-increasing period can be obtained using the time Y, the estimated differential pressure value Pdiff at the time of start of the open-close pressure-increasing control (that is, at the time of end of the pressure-reducing control which has been executed so far), and the map shown in FIG. 27. Notably, with this configuration, the wheel cylinder pressure Pw increasing stepwise throughout the open-close pressure-increasing control can be estimated on the basis of the estimated wheel cylinder pressure value Pw at the time of start of the open-close pressure-increasing control (that is, at the time of end of the pressure-reducing control which has been executed so far) and the pressure rise amount of the wheel cylinder pressure during each pressure-increasing period.

As a result, the length of each pressure-holding period (times X1 to X5 shown in FIG. 26) can be set such that the ratio of the pressure rise amount of the wheel cylinder pressure during a single pressure-increasing period to the sum of that pressure-increasing period and the preceding single pressure-holding period (that is, the average rising gradient of the wheel cylinder pressure) becomes equal to the rising gradient of the wheel cylinder pressure (the value corresponding to the value Kup in Step 2126) when the linear pressure-increasing control is performed with linear solenoid valve. Thus, in the open-close pressure-increasing control, there can be obtained a wheel-cylinder-pressure increasing characteristic which is substantially identical with that in the case where the linear pressure-increasing control is performed by use of the linear solenoid valve.

What is claimed is:

1. An antiskid control apparatus for a vehicle comprising:
   antiskid control means for continuously performing an antiskid control a plurality of times, the antiskid control including pressure-reducing control which is first performed and pressure-increasing control which is performed after the pressure-reducing control, the pressure-reducing control being performed by controlling a pressure-reducing valve, interposed in a first hydraulic circuit between a wheel cylinder and a reservoir, with a pressure-increasing valve, interposed in a second hydraulic circuit between the wheel cylinder and a master cylinder, kept closed so as to reduce wheel cylinder pressure, and the pressure-increasing control being performed by controlling the pressure-increasing valve with the pressure-reducing valve kept closed so as to increase the wheel cylinder pressure;
   first obtaining means for obtaining an estimated initial wheel cylinder pressure value, which is an estimated value representing the wheel cylinder pressure at the start of a first-time antiskid control;
   second obtaining means for obtaining an estimated value representing the wheel cylinder pressure, which varies throughout the antiskid control, by making use of at least the estimated initial wheel cylinder pressure value;
   third obtaining means for obtaining an estimated value representing the differential pressure between a master cylinder pressure and the wheel cylinder pressure on the basis of the difference between the estimated initial wheel cylinder pressure value and the estimated wheel cylinder pressure value;
   pressure-increasing-valve control means for controlling the pressure-increasing valve during the pressure-increasing control on the basis of the estimated differential pressure value;
   wherein the first obtaining means obtains the estimated initial wheel cylinder pressure value in consideration of a wheel cylinder pressure at which lock of a wheel occurs and which is obtained on the basis of vehicle body deceleration of the vehicle; and
   the first obtaining means obtains the estimated initial wheel cylinder pressure value in consideration of a time interval between the start of the driver's brake operation and the start of the first-time antiskid control.

2. A an antiskid control apparatus for a vehicle according to claim 1, wherein
   the first obtaining means obtains the estimated initial wheel cylinder pressure value by correcting the estimated initial wheel cylinder pressure value, obtained in consideration of the wheel cylinder pressure at which lock of a wheel occurs and which is determined on the basis of the vehicle body deceleration, on the basis of the time interval between the start of the driver's brake operation and the start of the first-time antiskid control.

3. A an antiskid control apparatus for a vehicle according to claim 1, wherein
   the third obtaining means sets the estimated differential pressure value to be larger by an amount corresponding to the interval between the start of the driver's brake operation and the start of the antiskid control, from the start of the pressure-increasing control in the first-time antiskid control.

4. A an antiskid control apparatus for a vehicle according to claim 1, wherein
   the pressure-increasing-valve control means determines an open-close pattern of the pressure-increasing valve, which is an on-off solenoid valve and which can be selectively controlled to an open state and a closed state, during the pressure-increasing control, on the basis of the estimated differential pressure value.

5. A an antiskid control apparatus for a vehicle according to claim 1, wherein
   the pressure-increasing-valve control means determines current supplied to the pressure-increasing valve, which is a linear solenoid valve and which can adjust the differential pressure in accordance with the current, during the pressure-increasing control on the basis of the estimated differential pressure value.

6. A an antiskid control apparatus for a vehicle according to claim 5, wherein
   the third obtaining means sets an upper limit of the wheel cylinder pressure in consideration of a wheel cylinder pressure at which lock of a wheel occurs and which is determined on the basis of vehicle body deceleration of the vehicle, and decreases the estimated differential pressure value when the estimated wheel cylinder pressure value at the time of start of a second-time or subsequent antiskid control exceeds the upper limit.

7. A an antiskid control apparatus for a vehicle according to claim 5, wherein
   the third obtaining means sets a lower limit of the wheel cylinder pressure in consideration of a wheel cylinder pressure at which lock of a wheel occurs and which is determined on the basis of vehicle body deceleration of the vehicle, and increases the estimated differential pressure value when the estimated wheel cylinder pressure value at the time of start of a second-time or subsequent antiskid control becomes lower than the lower limit.

8. A an antiskid control apparatus for a vehicle according to claim 5, wherein
   the third obtaining means includes determination means for determining whether or not a predetermined hunting phenomenon currently occurs in relation to rotational speed of a wheel, and increases the estimated differential pressure value by a predetermined amount when the predetermined hunting phenomenon is determined to currently occur.

9. A an antiskid control apparatus for a vehicle according to claim 8, wherein
   the determination means determines whether or not a predetermined hunting phenomenon occurs in relation to rotational speed of the wheel every time the antiskid control is started; and
   the third obtaining means is configured such that the amount by which the estimated differential pressure value is increased is increased by a predetermined amount every time the hunting phenomenon is determined to currently occur.

10. A an antiskid control apparatus for a vehicle according to claim 9, wherein
    the third obtaining means is configured such that the amount by which the estimated differential pressure value is increased is reduced during a period between a predetermined time point in the pressure-increasing control and the end of the pressure-increasing control, and after a time point at which the predetermined hunting phenomenon is determined not to currently occur in relation to rotational speed of the wheel, the amount by which the estimated differential pressure value is increased is maintained at the value at that time point.

11. An antiskid apparatus for a vehicle comprising:
    a pressure-reducing valve interposed in a first hydraulic circuit between a wheel cylinder and a reservoir;

a pressure-increasing valve interposed in a second hydraulic circuit between the wheel cylinder and a master cylinder;

antiskid control means for continuously performing an antiskid control a plurality of times, the antiskid control including pressure-reducing control which is first performed and pressure-increasing control which is performed after the pressure-reducing control, the pressure-reducing control being performed by controlling the pressure-reducing valve with the pressure-increasing valve kept closed so as to reduce wheel cylinder pressure, and the pressure-increasing control being performed by controlling the pressure-increasing valve with the pressure-reducing valve kept closed so as to increase the wheel cylinder pressure;

first obtaining means for obtaining an estimated initial wheel cylinder pressure value, which is an estimated value representing the wheel cylinder pressure at the start of a first-time antiskid control;

second obtaining means for obtaining an estimated value representing the wheel cylinder pressure, which varies throughout the antiskid control, by making use of at least the estimated initial wheel cylinder pressure value;

third obtaining means for obtaining an estimated value representing the differential pressure between a master cylinder pressure and the wheel cylinder pressure on the basis of the difference between the estimated initial wheel cylinder pressure value and the estimated wheel cylinder pressure value; and pressure-increasing-valve control means for controlling the pressure-increasing valve during the pressure-increasing control on the basis of the estimated differential pressure values;

wherein the first obtaining means obtains the estimated initial wheel cylinder pressure value in consideration of a wheel cylinder pressure at which lock of a wheel occurs and which is obtained on the basis of vehicle body deceleration of the vehicle; and the first obtaining means obtains the estimated initial wheel cylinder pressure value in consideration of a time interval between the start of the driver's brake operation and the start of the first-time antiskid control.

12. An antiskid control apparatus for a vehicle to continuously perform an antiskid control a plurality of times, the antiskid control alternately reducing and increasing a wheel cylinder pressure of a vehicle comprising:

first estimating means for estimating a first value representing the wheel cylinder pressure at a first reducing state of the antiskid control;

second estimating means for estimating a second value representing the wheel cylinder pressure at an increasing state of the antiskid control on the basis of the first value;

third estimating means for estimating a third value representing a differential pressure between a master cylinder pressure and the wheel cylinder pressure on the basis of a difference between the first value and the second value; and pressure increasing means for increasing the wheel cylinder pressure on the basis of the third value at the increasing states;

wherein the first obtaining means obtains the estimated initial wheel cylinder pressure value in consideration of a wheel cylinder pressure at which lock of a wheel occurs and which is obtained on the basis of vehicle body deceleration of the vehicle; and the first obtaining means obtains the estimated initial wheel cylinder pressure value in consideration of a time interval between the start of the driver's brake operation and the start of the first-time antiskid control.

* * * * *